United States Patent
Schlagel

(10) Patent No.: US 10,059,513 B1
(45) Date of Patent: Aug. 28, 2018

(54) GATE WITH ANTI-FOULING PROXIMITY INDICATORS FOR HANDLING AGRICULTURAL GRANULAR MATERIALS

(71) Applicant: Schlagel, Inc., Cambridge, MN (US)

(72) Inventor: Bill Schlagel, Ham Lake, MN (US)

(73) Assignee: Schlagel, Inc., Cambridge, MN (US)

( * ) Notice: Subject to any disclaimer, the term of this patent is extended or adjusted under 35 U.S.C. 154(b) by 88 days.

(21) Appl. No.: 15/362,909

(22) Filed: Nov. 29, 2016

Related U.S. Application Data

(63) Continuation-in-part of application No. 14/148,090, filed on Jan. 6, 2014, now Pat. No. 9,527,665.

(60) Provisional application No. 61/749,181, filed on Jan. 4, 2013.

(51) Int. Cl.
*B65D 90/58* (2006.01)
*B65G 47/78* (2006.01)
*E06B 11/04* (2006.01)
*E05F 15/635* (2015.01)

(52) U.S. Cl.
CPC .......... *B65D 90/587* (2013.01); *B65G 47/78* (2013.01); *E05F 15/635* (2015.01); *E06B 11/045* (2013.01); *E05Y 2900/40* (2013.01)

(58) Field of Classification Search
CPC ...... B65D 90/587; B65D 90/66; B65D 90/54; B65D 90/48; B65D 88/54; B65D 2590/0083; B61D 7/20; E06B 11/045; E05F 15/41; E05F 15/40; E05F 15/42
See application file for complete search history.

(56) References Cited

U.S. PATENT DOCUMENTS

| | | | |
|---|---|---|---|
| 3,089,435 A | 5/1963 | Floehr | |
| 3,252,630 A | 5/1966 | Berg | |
| 4,058,199 A | 11/1977 | Schlagel | |
| 4,107,877 A | 8/1978 | Lee | |
| 4,301,741 A * | 11/1981 | Chierici | B65D 90/587 105/282.3 |
| 4,359,176 A | 11/1982 | Johnson | |
| 4,429,264 A | 1/1984 | Richmond | |

(Continued)

FOREIGN PATENT DOCUMENTS

| | | |
|---|---|---|
| CA | 1151124 | 8/1983 |
| CA | 2128497 C | 7/1994 |
| WO | WO 2012/078555 A1 | 6/2012 |

OTHER PUBLICATIONS

PICOR [online] "Data Sheet Horizontal Slide Gates," First Accessed on Dec. 10, 2013. Retrieved from the Internet: http://www.picor.biz/pdfs/Picor%20Horizontal%20Slide%20Gate.pdf (1 pg.).

(Continued)

*Primary Examiner* — Justin B Rephann
(74) *Attorney, Agent, or Firm* — Christensen, Fonder, Dardi & Herbert PLLC

(57) ABSTRACT

A gate control system that provides repeatable and reliable gate position sensing in a fully open position, a fully closed position, or both. In various embodiments, proximity sensors are maintained in biased contact (continuously or intermittently) with the gate panel throughout the travel range of the gate panel. The system may also include anti-fouling or "self-cleaning" of the proximity sensor(s), whereby the proximity sensors are cleared of materials that would otherwise interfere with the repeatability of the position sensing.

22 Claims, 17 Drawing Sheets

(56) References Cited

U.S. PATENT DOCUMENTS

| | | | |
|---|---|---|---|
| 4,475,672 A * | 10/1984 | Whitehead | B60P 1/56 105/282.3 |
| 4,625,291 A | 11/1986 | Hormann | |
| 5,038,966 A * | 8/1991 | Olk | B61D 7/20 105/282.1 |
| 5,048,594 A | 9/1991 | Cecchini et al. | |
| 5,092,490 A | 3/1992 | Suzuki et al. | |
| 5,301,848 A | 4/1994 | Conrad et al. | |
| 5,507,235 A | 4/1996 | Dugge et al. | |
| 5,613,446 A | 3/1997 | Diluigi et al. | |
| 5,712,621 A | 1/1998 | Andersen | |
| 5,746,452 A | 5/1998 | El-Ibiary et al. | |
| 5,864,134 A | 1/1999 | Burgess | |
| 6,007,119 A * | 12/1999 | Roth | E05C 19/166 292/251.5 |
| 6,025,685 A | 2/2000 | Parsadayan | |
| 6,055,771 A | 5/2000 | Warnacut | |
| 6,059,094 A | 5/2000 | Swanstrom, Jr. et al. | |
| 6,073,802 A | 6/2000 | Sampson et al. | |
| 6,135,268 A | 10/2000 | Couch et al. | |
| 6,216,393 B1 | 4/2001 | Apprich | |
| 6,378,688 B1 | 4/2002 | Fitzgerald et al. | |
| 6,505,727 B2 | 1/2003 | Schroeder et al. | |
| 6,508,387 B1 | 1/2003 | Simon et al. | |
| 6,667,562 B1 | 12/2003 | Heinrich | |
| 6,945,382 B2 | 9/2005 | Harstad et al. | |
| 7,222,714 B2 | 5/2007 | Lilly | |
| 7,475,767 B2 | 1/2009 | Crawford et al. | |
| 7,614,824 B2 | 11/2009 | Aughton et al. | |
| 7,735,700 B2 | 6/2010 | Ruikka et al. | |
| 8,177,095 B1 | 5/2012 | Renyer et al. | |
| 8,348,103 B1 | 1/2013 | Renyer et al. | |
| 8,763,323 B1 * | 7/2014 | Even | E04H 7/22 52/192 |
| 8,850,991 B2 | 10/2014 | Early et al. | |
| 9,052,034 B1 | 6/2015 | Wegner et al. | |
| 2002/0088694 A1 | 7/2002 | Thompson et al. | |
| 2005/0210752 A1 | 9/2005 | Schulte | |
| 2007/0005186 A1 * | 1/2007 | Wietgrefe | B65D 88/30 700/236 |
| 2009/0038242 A1 | 2/2009 | Cope | |
| 2011/0198911 A1 | 8/2011 | Biefelt | |
| 2011/0308164 A1 * | 12/2011 | Terasaki | B61D 19/026 49/360 |
| 2012/0062242 A1 | 3/2012 | De Huu et al. | |
| 2013/0104635 A1 | 5/2013 | Hoetzel | |
| 2013/0239698 A1 | 9/2013 | Aughton et al. | |
| 2014/0190084 A1 | 7/2014 | Schlagel | |
| 2014/0292001 A1 | 10/2014 | Nunez et al. | |
| 2016/0302352 A1 * | 10/2016 | Tramp | A01C 1/06 |

OTHER PUBLICATIONS

Newell Machinery [online], "Newell Machinery web page Excerpts," First Accessed on Dec. 10, 2013. Retrieved from the Internet: http://www.newellmachinery.com (1 pg.).

Electro Sensors, Inc. [online] "Slide Gate & Angle Position," First Accessed on Dec. 10, 2013. Retrieved from the Internet: http://www.electro-sensors.com (3 pgs.).

* cited by examiner

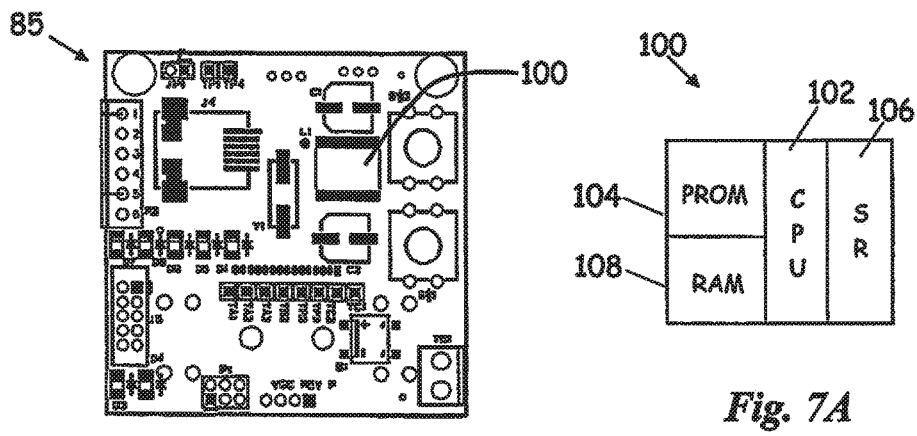
*Fig. 7*
*Fig. 7A*
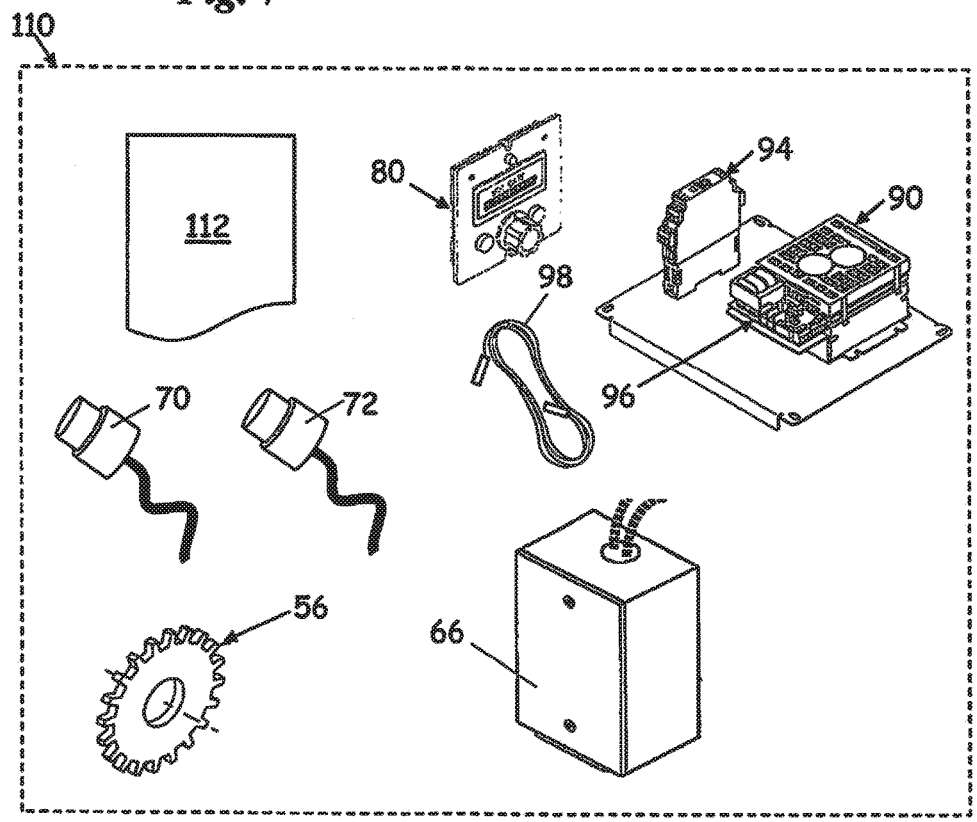
*Fig. 8*

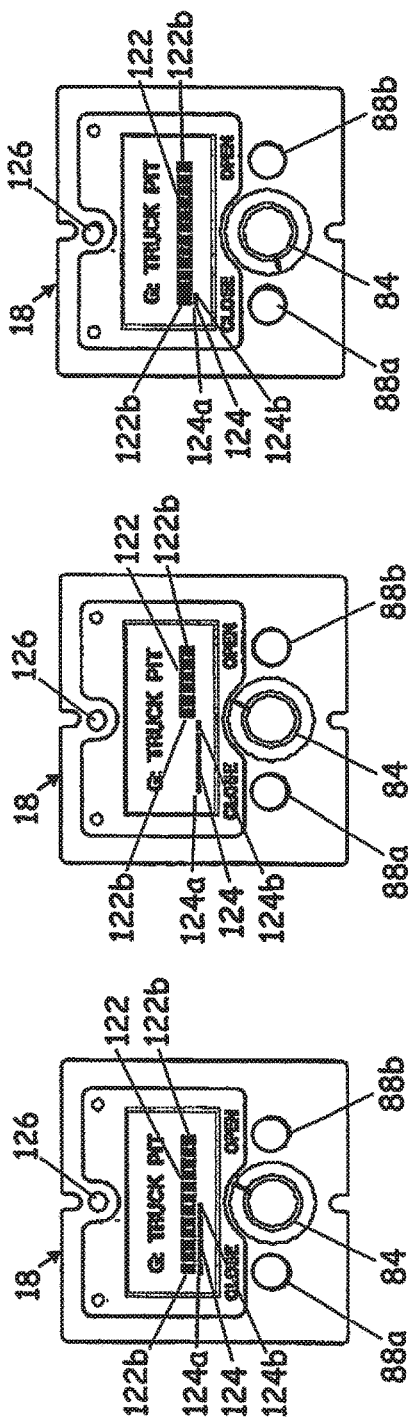
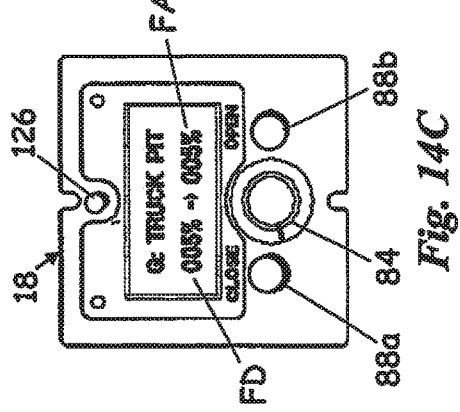
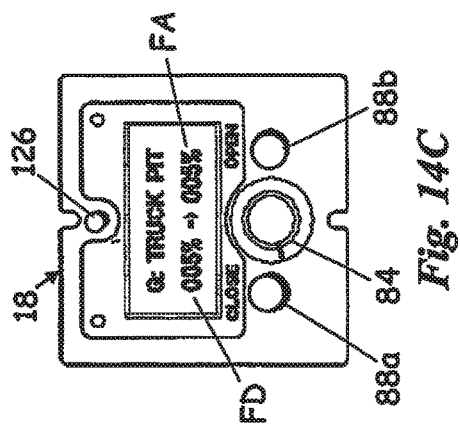
Fig. 13A Fig. 13B Fig. 13C
Fig. 14A Fig. 14B Fig. 14C

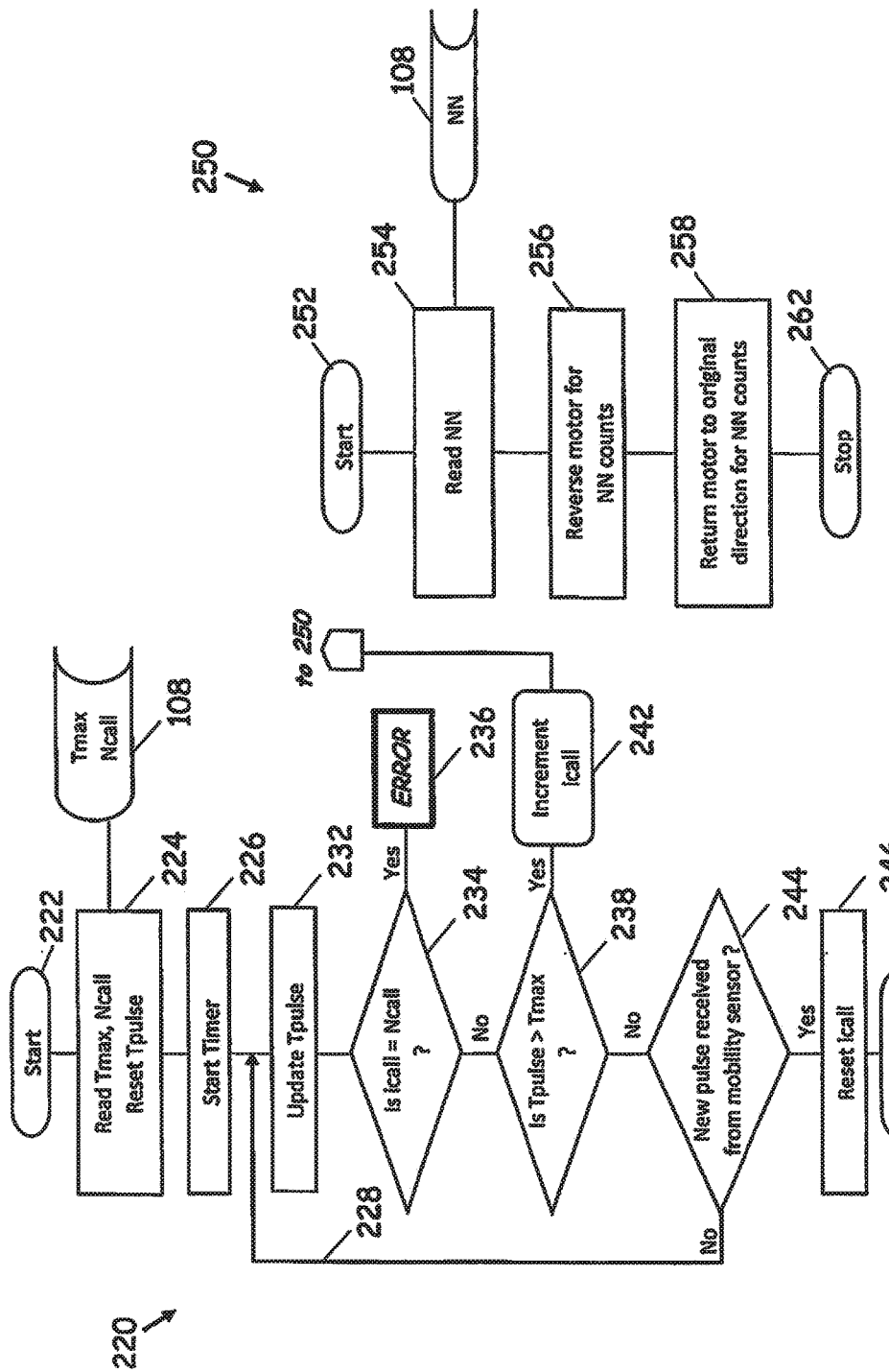

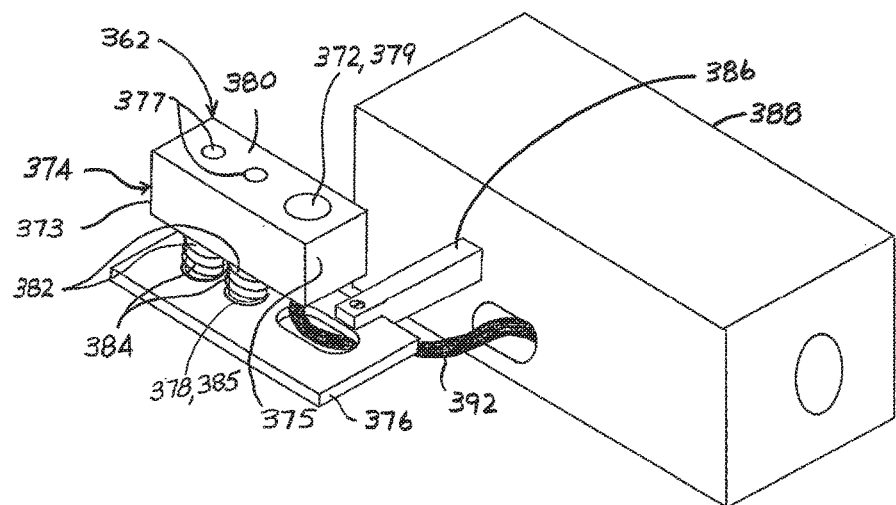
FIG. 19
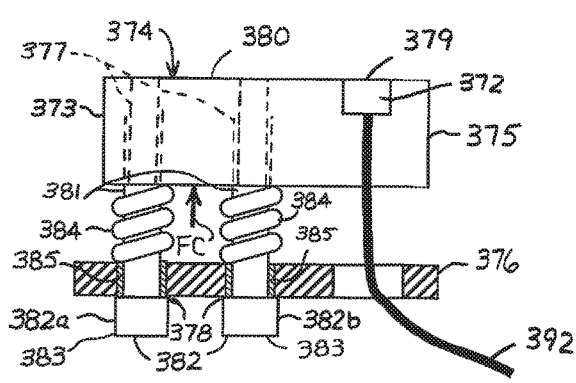
FIG. 20
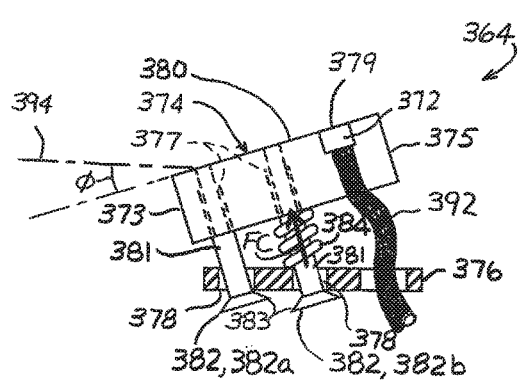
FIG. 21
FIG. 22

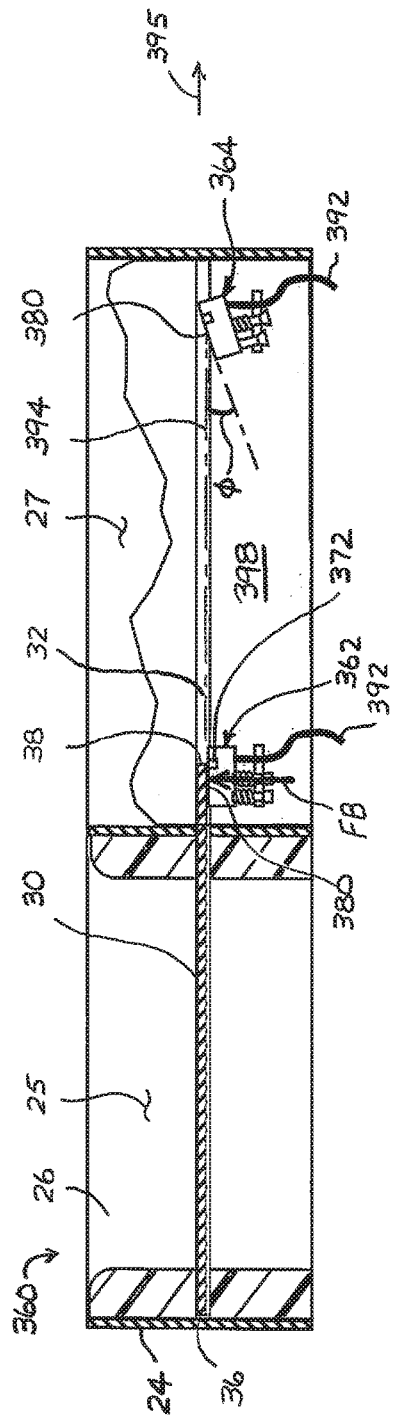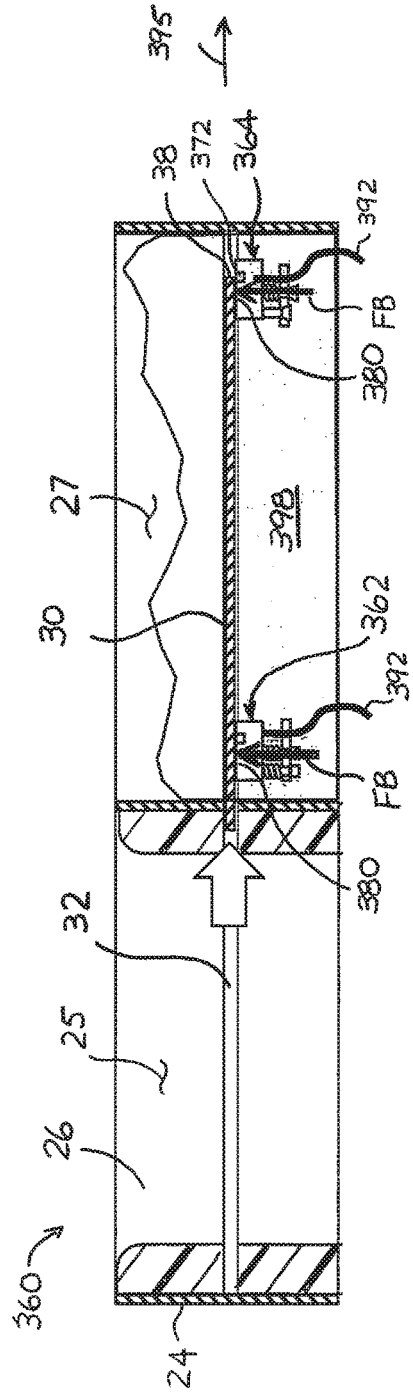

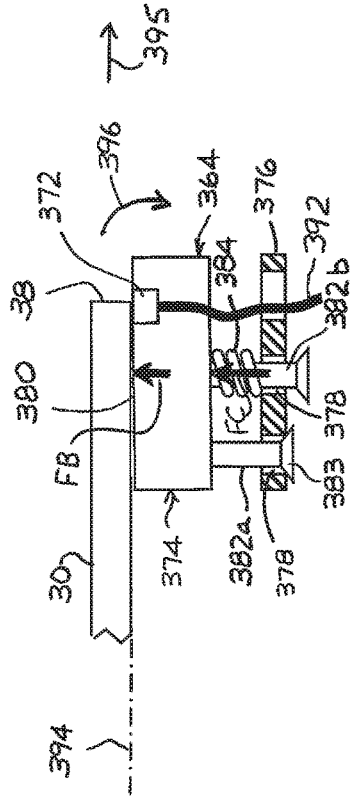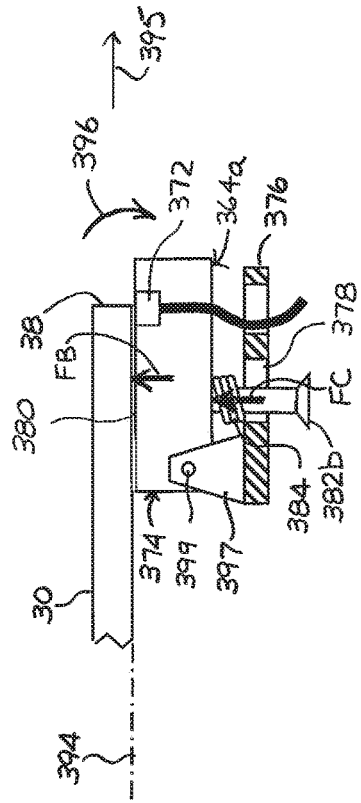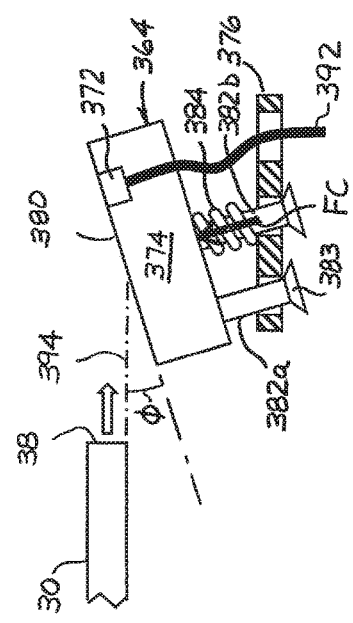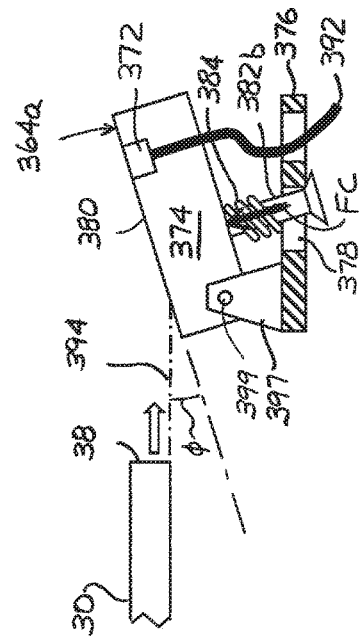

GATE WITH ANTI-FOULING PROXIMITY INDICATORS FOR HANDLING AGRICULTURAL GRANULAR MATERIALS

RELATED APPLICATIONS

This application is a continuation-in-part of U.S. patent application Ser. No. 14/148,090, filed Jan. 6, 2014, which claims the benefit of U.S. Provisional Patent Application No. 61/749,181, filed Jan. 4, 2013. The disclosures of these related applications are incorporated by reference herein in their entirety.

FIELD OF THE DISCLOSURE

This disclosure relates generally to the handling of bulk materials and more specifically to gates for controlling flow of agricultural granular materials such as grain, feed, and fertilizer.

BACKGROUND OF THE DISCLOSURE

Grain elevators store and sort massive amounts of different grains. Conveyance systems move the grain to various locations within an elevator for processing (e.g., drying and moisture content mixing), storage, and shipment. The conveyance systems rely on proper control of the volumetric flow of the grain elevator to keep running smoothly. If the flow rate into a given conveyor is too high, the receiving system can become overwhelmed and rendered inoperable until the situation is remedied. Flow rates that are too low cause processing delays. Delays associated with conveyance systems can be problematic, particularly during periods of high volumetric movement, such as during the autumn harvest.

The distribution and flow control of grain into, within, and out of a grain elevator often includes the use of variable position gates. Such gates allow adjustment of the size of the opening to control the quantity of grain passing therethrough to prevent, for example, overloading of a conveyor. Such gates can be open or closed or adjusted manually or electronically. Several electronic drive packages and mechanisms have been adopted for use in variable opening gates for use in grain elevators. Typically such systems are complicated, expensive and lack reliability.

Other errors in handling can also lead to dockage penalties, such as by mixing different grains. For example, an operator must often rely on remote sensing of the status of a gate, because the gate is located remotely or is otherwise immersed within a structure in a way that visual inspection is unavailable. A gate that is indicated as fully closed by a fouled or misaligned proximity switch, when in fact the gate is slightly opened enough for grain to pass therethrough, even at a low trickle, can cause the aforementioned mixing of different grains. Likewise, a fouled or misaligned proximity switch can cause a faulty indication that a gate is fully opened when it is not, or that a gate is not fully opened when in fact it is fully opened.

Grain handling gates that overcome these shortcomings would be welcomed.

SUMMARY OF THE DISCLOSURE

Various embodiments of the disclosure present a gate control system that provides repeatable and reliable gate position sensing in a fully open position, a fully closed position, or both by maintaining continuous or intermittent contact with the gate panel throughout the travel range of the gate panel. The gate assembly may be a variable gate assembly, capable of being positioned intermittently between the fully closed and fully opened position, or a "binary" gate assembly having only a fully opened and a fully closed static configuration. Various embodiments of the disclosure also provide anti-fouling or "self-cleaning" of the proximity sensor(s). Often, during operation of translatable gates in an agricultural setting such as a grain elevator, granular material can build up in the retraction bay of the gate frame, the retraction bay being the portion of the gate frame into which the gate panel retracts when the gate is opened. Various embodiments of the disclosure provide an arrangement whereby the proximity sensors are cleared of materials that would otherwise interfere with the repeatability of the position sensing.

Conventional gate control systems utilize mechanical limit switches. Mechanical limit switches are prone to hysteresis, wherein there is effectively a dead band between the closed position and the open position. Such hysteresis can cause a false indication of a fully opened or a fully closed gate when, in fact, the gate is not fully opened or fully closed, leading to the aforementioned mixing of different grains.

So-called non-contact sensors, such as inductive sensors, do not possess the same degree of hysteresis as mechanical switches. However, because their operation does not rely on physical engagement with the sensed article, other problems can arise in their use. In the context of a grain elevator gate, the gate may be influenced by external forces that affects the trajectory of the gate panel as the gate panel translates within a sliding or a roller track. For example, for gate systems where the gate panel is translated within grooves provided in a gate frame, the clearance between the gate panel and the grooves is necessarily a loose fit, to enable translation of the gate panel within the grooves. The looseness of the fit can cause the gate panel to track along slightly different trajectories, depending on what external forces are acting on the gate panel (e.g.: presence or non-presence of grain; changes in tolerance due to temperature; wear erosion of sliding interfaces over time). Such changes in the trajectory of the gate panel can cause misalignment of the non-contact sensor, so that the indicated fully opened or fully closed positions do not correlate with the actual fully opened or fully closed positions.

Another factor in the grain or feed handling context is the presence or buildup of granular and particulate materials. Such materials can come between the sensor and the gate panel, because of the very nature of such "non-contact" sensors. The presence of such material can attenuate the signal (e.g., the coupling between the inductive sensor and the gate), thus affecting the indication of the presence of the gate panel.

Various embodiments of the disclosure overcome the obstacles associated with certain "non-contact" sensing systems for accurate, repeatable gate position sensing.

Structurally, in various embodiments, a gate assembly that provides reliable position sensing and anti-fouling of proximity sensing comprises a gate frame that defines an opening, the opening being adapted for flow of a granular agricultural material therethrough, and a gate panel translatably mounted within the gate frame. The gate panel includes a first edge that translates within the opening of the gate frame during operation, and a second edge opposite the first edge. In some embodiments, a first proximity sensor assembly positioned to detect the second edge of the gate panel when the gate panel is in a fully closed position. In some embodiments, the first proximity sensor assembly is biased against the gate panel to maintain sliding contact with the gate panel over an entire range of travel of the gate panel.

A second proximity sensor assembly may be positioned to detect the second edge of the gate panel when the gate panel is in a fully opened position, wherein the second proximity sensor assembly is biased against the gate panel and is in sliding contact with the gate panel when the gate panel approaches the fully opened position. In some embodiments, the second proximity sensor assembly is disengaged from the gate panel when the gate panel is in the fully closed position. A contact face of the second proximity sensor assembly is arranged at an acute angle relative to a plane of travel of the gate panel.

In some embodiments, a contact face of the second proximity sensor assembly is arranged at an acute angle relative to a plane of travel of the gate panel when disengaged from the gate panel, the second proximity sensor being configured to engage and be biased against the gate panel with the contact face parallel to the plane of travel of the gate panel after engagement with the gate panel. The contact face of the second proximity sensor may be positioned to intersect the plane of travel.

In some embodiments, one or both of the first proximity sensor assembly and the second proximity sensor assembly includes a sensing element disposed in a housing. The sensing element of the one or both of the first proximity sensor assembly and the second proximity sensor assembly may include a sensing face that is substantially flush with a contact face of the housing, the contact face of the housing being configured for the sliding contact with the gate panel. Alternatively, the sensing face may be recessed relative to the contact face of the housing to inhibit abrasion of the sensing face as the gate passes over the sensing face. Also, one or both of the first proximity sensor assembly and the second proximity sensor assembly may be biased against the gate panel by a coil spring that is in contact with the housing. In some embodiments, one or both of the first proximity sensor assembly and the second proximity sensor assembly is mounted to a bracket, the coil spring acting in compression between the bracket and the housing.

In some embodiments, the second proximity sensor assembly includes a bracket, a sensing element disposed in a housing, the housing being pivotally coupled to the bracket, and a coil spring disposed between and in contact with the housing and the bracket, wherein the second proximity sensor assembly is biased against the gate panel by the coil spring. In some embodiments, the housing is pivotable about a head of a mounting fastener, the mounting fastener extending from the bracket to the housing, the head of the mounting fastener being in contact with the bracket. In other embodiments, the housing is pivotable about a pivot pin that extends lateral to a direction of travel of the gate panel.

In various embodiments, one or both of the first proximity sensor assembly and the second proximity sensor assembly includes an inductive sensor. In some embodiments, the gate panel is adapted for translation to a plurality of intermediate static positions, each of the plurality of intermediate static positions being intermediate between the fully closed position and the fully open position within the gate frame. Also, the gate frame may include a retraction bay adjacent the opening, where the second edge of the gate frame translates within the retraction bay of the gate frame during operation.

Various embodiments of the disclosure provide a gate control system that utilizes digital signals for determining a position (e.g., open fraction) of a variable gate assembly. Digital signals (e.g., pulse trains wherein the pulses are counted) are less prone to error than their analog counterparts. Remotely operated gates must reliably position a gate located in an explosive environment, sometimes being controlled from several meters away. In comparison to state of the art analog control systems, the various embodiments disclosed herein as they can be less sensitive to electrical noise, more suitable for transmission of information over greater distances, and can be essentially insensitive to temperature variation, which can typically range from −40° F. to +120° F. over the course of a year. In some embodiments, the control system is explosion proof and intrinsically safe, suitable for use, for example, in NEC class II, division 2, group G environments.

Some embodiments of the disclosure can provide the above-mentioned features utilizing only two proximity-type sensors. The proximity sensors can be, but are not limited to, inductive, capacitive, magnetic, or mechanical closure (e.g., limit switches) sensors, or a combination thereof. One sensor can be positioned to sense the proximity (i.e., presence/no presence) of the teeth of a metal sprocket directly tied to the mechanical drive system. The other sensor positioned to sense the fully closed position or the fully open position of the gate utilizing detection of the presence of lack of presence of metal directly associated with movement of the gate.

The pulse train signal generated by the gate control system provides a ready indication of gate stoppages due to an obstruction in the gate pathway or other malfunction. In certain embodiments, the period of the pulses within the pulse train is monitored. Detection of the obstruction or malfunction occurs if the period of the pulse exceeds a predetermined value. Monitoring of the pulse period is fast and efficient, and thus suitable for programming as an interrupt service routine.

The digital aspect of the disclosed control systems are also adaptable to any sized gate. Currently available systems that utilize analog devices to determine gate position (e.g., turn pot potentiometers) typically require proper sizing of the analog device to provide the necessary resolution of the gate position. That is, a gate that has a stroke of only a meter or so will require a different analog potentiometer than will a gate of, say, 10 meters or more, in order to provide meaningful resolution to the control system. Embodiments of the present system can be utilized for any sized gate, because it merely registers more or less counts in an integer variable.

Several embodiments of the disclosed system can be retrofit to existing slide gate systems, thus avoiding the expense of costly replacement. In addition, various embodiments of the disclosure can be implemented using common industrial components that are inexpensive and readily available from numerous sources. The use of such common industrial components is in sharp contrast to other systems that are currently available on the market; such systems often comprise custom, proprietary components, such as housings of specific shape, drive mechanisms (e.g., thrusting screws and couplings) of specific construction, and special motors.

Various embodiments of the disclosure enable the various components to be located in the open (unlike optically coupled devices) for easy maintenance and replacement. In some embodiments, the only mechanical components that are present in potentially hazardous areas is the motor, the transmission, and the drive mechanism (e.g., rack and pinion mechanism). This reduces or eliminates spark ignition sources.

In various disclosed embodiments, a grain handling system comprises a grain reservoir, a variable opening gate positioned for controlling discharge from the grain reservoir to a conveyance system, a mechanical drive system with an electric motor connected to the variable opening gate, a pair of presence/no presence (i.e., proximity) sensors, one configured as an incremental gate movement sensor attached to the drive system, the other configured as a gate closed sensor, a drive package positioned in proximity to the variable opening gate and providing power wiring to the motor and connecting to the presence/no presence sensors, the drive package connecting to a remote user interface control module, the remote user interface module having gate adjustment input for positioning the gate and a visual indicator for indicating the precise position of the gate.

In one embodiment, a grain handling facility has an operator control center or region located remotely from a grain handling operational area, the operator control area having a user interface module with a visual gate position indicator and a gate control, the user interface module connected by a ribbon cable to the operational area, the operational area having a variable gate control with an electric motor connected by a motion translation system to the gate of the variable opening gate positioned for controlling the flow of grain from a grain supply region to a grain transfer region, a sensor connected to the variable gate control to incrementally sense the movement of the gate and a further sensor connected to sense full closure of the gate, the sensors connected to a drive package in the operational area that provides power to the motor, provides circuitry for the sensor and user interface module and connects to the ribbon cable. The sensors can be any one of a number of non-contact sensors that are not susceptible to fouling in particle-laden environments, such as inductive sensors, capacitive sensors, and magnetic sensors. In various embodiments, complete control of the variable opening gate is remotely controlled from the operator control area using only a ribbon cable to connect the drive package to the operator interface.

Structurally, the variable gate and central controller includes a gate frame that defines an opening, the gate frame being adapted for installation on a grain elevator, and the opening being adapted for the flow of grain therethrough. A gate panel is translatably mounted within a gate frame, the gate panel being adapted for translation to a static position, the static position being intermediate between a fully closed position and a fully open position within the gate frame. A drive mechanism is coupled to the gate panel. In one embodiment, the drive mechanism includes a rack and pinion gearing with a drive shaft coupled to the pinion. An electric motor is operatively coupled with the drive shaft. In other embodiments a chain drive system or screw system could be utilized within the drive mechanism.

In various embodiments, a sensor is configured as a mobility sensor for detecting a translational movement of the gate panel as a serial pulse train signal indicating presence and no presence. A panel proximity sensor can be positioned for detecting when the gate panel is in one of the fully open position and the fully closed position. A central controller, such as a microprocessor, is adapted to selectively control the electric motor (or other mechanical actuator) in a first rotational direction and a second rotational direction, the central controller being adapted to receive signals from the mobility sensor and the panel proximity sensor.

In one embodiment, a fraction of the opening is obstructed by the gate panel, the fraction being resolved based only on signals generated by the mobility sensor and the panel proximity sensor.

A feature and advantage of some embodiments is that a minimal number of components for controlling the operation of and sensing the position of the variable position gate are provided at the gate. A further feature and advantage can be the use of low voltage wiring between the components at the gate or in proximity to the gate, and the control components including the user interface located remotely.

A feature and advantage of various embodiments is that a highly modular system is provided that facilitates repairs, trouble-shooting, maintenance and that offers enhanced safety in the grain handling environment. Repairs and replacements can be done with commonly available industrial components, reducing or negating the need for custom-made components.

A feature and advantage of certain embodiments is that the sensing of the movement of the gate is provided by a pulse train which can be readily analyzed and/or sensed for variances from the norm for detection of operational issues such as obstructions or mechanical failures. In particular, for example, the length of the presence and no presence pulses can be monitored to detect variations from the norm.

A feature and advantage of various embodiments is that a standard ribbon cable with plug-in connections may be utilized for positioning the user interface module in an area tens or hundreds of meters remote from the operational area. This provides an easy install or retrofit of the system on existing grain handling facilities with variable opening gates.

A feature and advantage of some embodiments is that the sensors are open and exposed to the interior environment and utilize sprockets, racks, or strips of material with repeating metal/no metal regions such that operational integrity can be readily observed and such that grain or grain dust will not affect the operation of the sensors.

A feature and advantage of some embodiments is that active electronics such as processors, relays, switches, displays, are located out of the operation region, and positioned in the motor control region or the operator control region. In other embodiments, the active electronics are located in the motor control region or the operator control region, and is modular for easy installation, repair, and maintenance.

BRIEF DESCRIPTION OF THE DRAWINGS

FIG. 7 is a plan view of circuitry of the operator interface of FIG. 5;

FIG. 7A is a schematic of an integrated microprocessor for use in embodiments of the disclosure;

FIG. 8 is an unassembled view of a kit in an embodiment of the disclosure;

FIGS. 13A through 13C depicts a user interface having bar graph displays during operation in an embodiment of the disclosure;

FIGS. 14A through 14C depicts a user interface having numerical posting displays during operation in an embodiment of the disclosure;

FIG. 15 is a flow chart of a pulse check algorithm in an embodiment of the disclosure;

FIG. 16 is a flow chart of an obstruction clearing algorithm in an embodiment of the disclosure;

FIG. 19 is perspective view of a closed position proximity sensor assembly of FIG. 18 supported by a support arm and junction box in an embodiment of the disclosure;

FIG. 20 is a sectional view of the closed position proximity sensor assembly of FIG. 19;

FIG. 21 is a perspective view of an open position proximity sensor of FIG. 18 in an embodiment of the disclosure;

FIG. 22 is a sectional view of the open position proximity sensor of FIG. 21;

FIG. 23 is a sectional schematic view of the gate assembly of FIG. 18 in a fully closed position in an embodiment of the disclosure;

FIG. 24 is a sectional schematic view of the gate assembly of FIG. 18 in a fully open position in an embodiment of the disclosure;

FIG. 25 is a sectional view of the open position proximity sensor of FIG. 21 with the gate panel approaching in a distal direction in an embodiment of the disclosure;

FIG. 26 is the sectional view of the open position proximity sensor of FIG. 25 with the gate panel engaged therewith in the fully open position in an embodiment of the disclosure;

FIG. 27 is a sectional view of an alternative open position proximity sensor with the gate panel approaching in a distal direction in an embodiment of the disclosure;

FIG. 28 is the sectional view of the open position proximity sensor of FIG. 27 with the gate panel engaged therewith in the fully open position in an embodiment of the disclosure;

DETAILED DESCRIPTION

Figure 1:
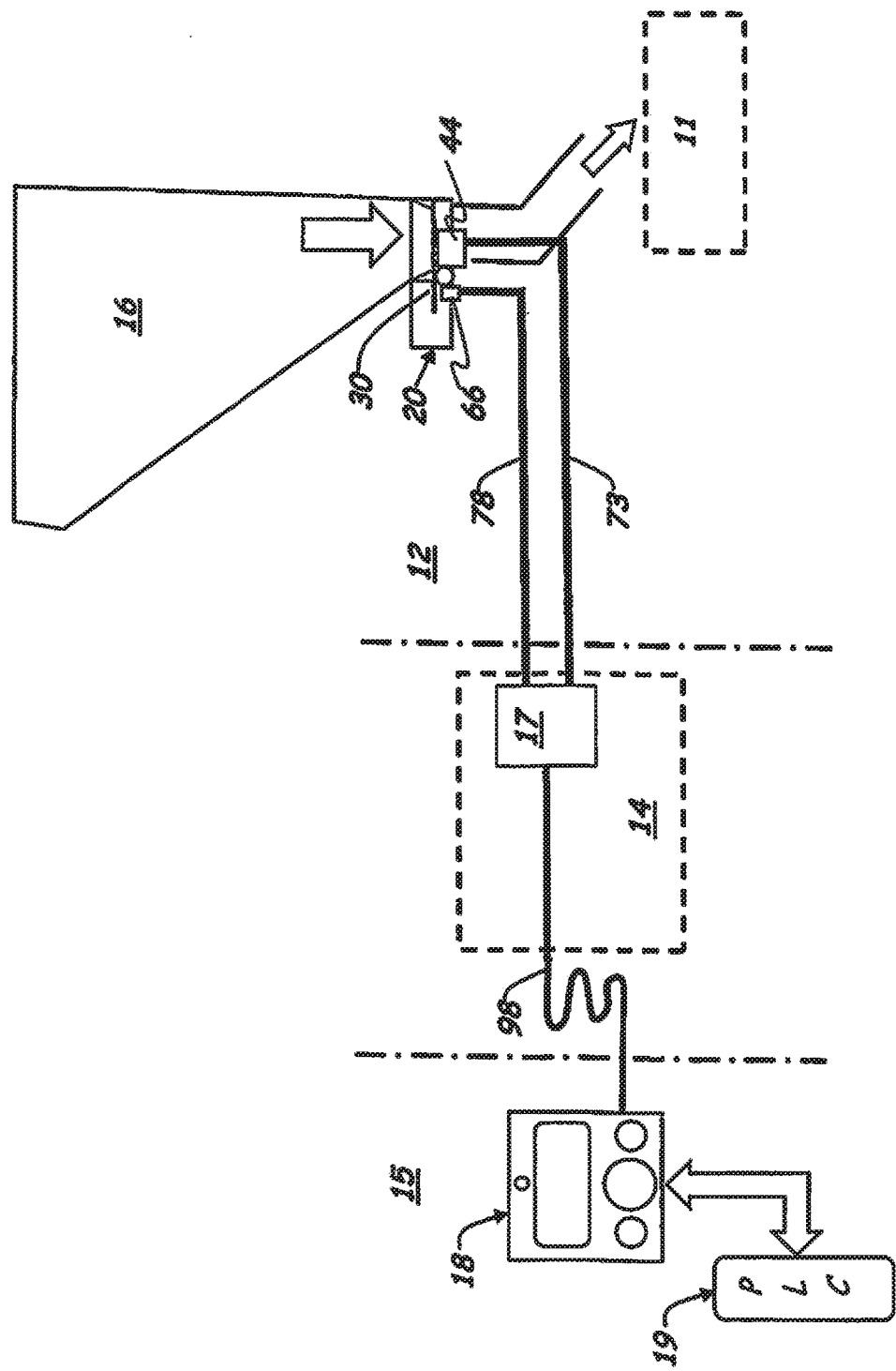
FIG. 1 is a schematic view of a grain handling facility incorporating the disclosures herein.

Referring to FIGS. 1 through 7, a variable gate assembly 20 is depicted in an embodiment of the disclosure. A grain handling facility 10 having an operational region 12, a motor control room or region 14, and an operator control region or room 15, is depicted in FIG. 1. Located in the operational region is a grain reservoir 16, configured as a bin, a variable opening gate 20, a grain transfer region 11, such as a conveyor or transport truck. Located in the motor control region is the drive package 17, with wiring to the variable opening gate and to an operator interface 18 positioned in the operator control region 15. While the depiction of FIG. 1 illustrates an application specific to grain elevators, handling of other agricultural granular materials with the variable gate assembly 20 is also contemplated. Additional examples include control of granular fertilizer in bagging operations, and control of feed onto a scale.

In one embodiment, a programmable logic controller (PLC) 19 or other remote controller can be configured to control the operator interface 18 remotely. When the PLC 19 controls the operator interface 18, the local controls can be locked out until the PLC 19 relinquishes control.

The variable gate assembly 20 includes a gate frame 24 that houses a gate panel 30. A portion of the gate frame 24 defines an opening 25 for passage of grain. The gate frame 24 may also define a retraction bay 27 adjacent the opening 25, so named because the gate panel 30 retracts (partially or completely) into it during operation. A pair of guides 26 can be mounted in the gate frame 24 adjacent the opening 25 and into the retraction bay 27, the guides 26 defining slots 32. The slots 32, when implemented, include lower edges 33 that are substantially parallel to each other to define a plane.

Figure 2:
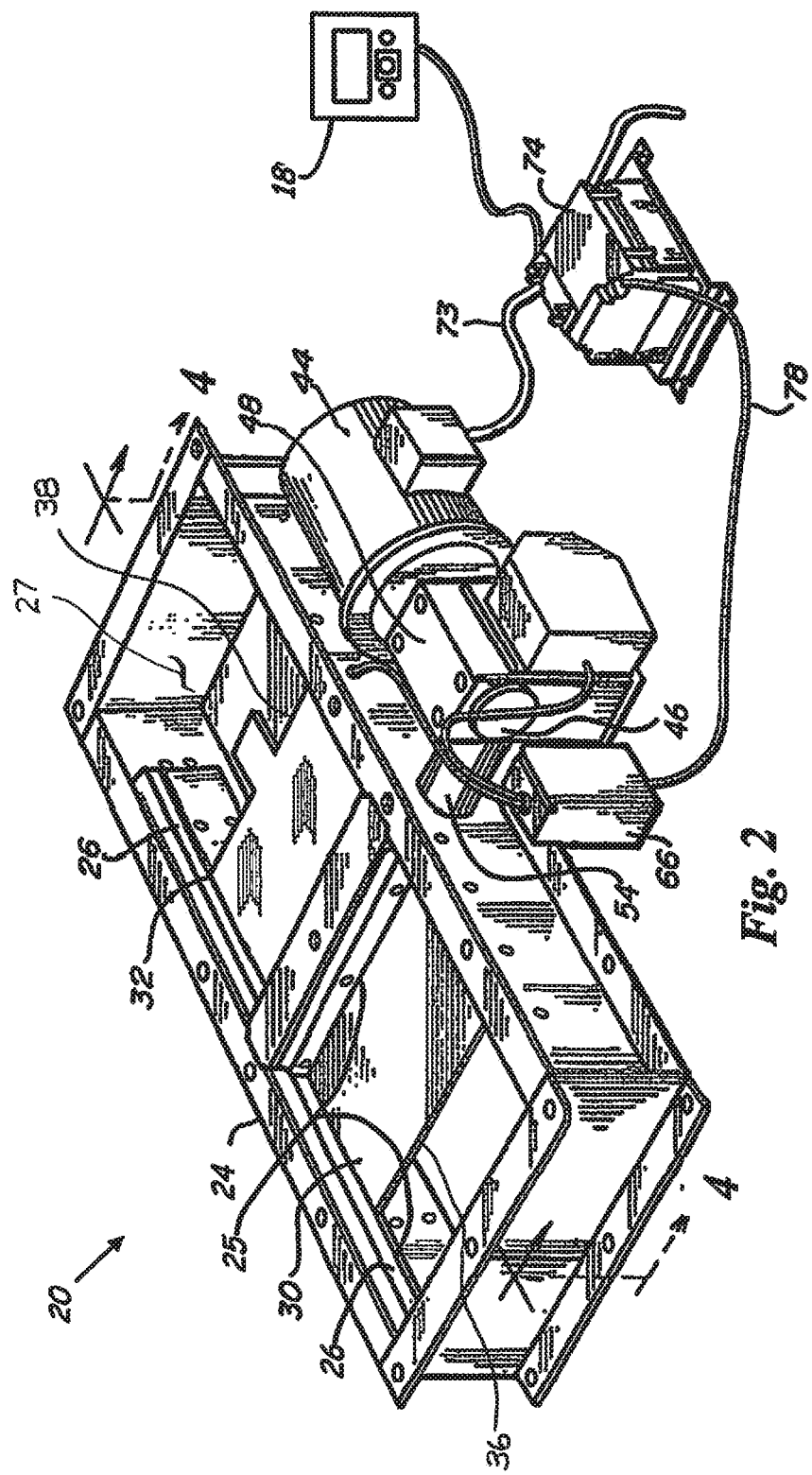
FIG. 2 is perspective view of a gate with a variable gate control in a static, partially open position in an embodiment of the disclosure.
Figure 4:
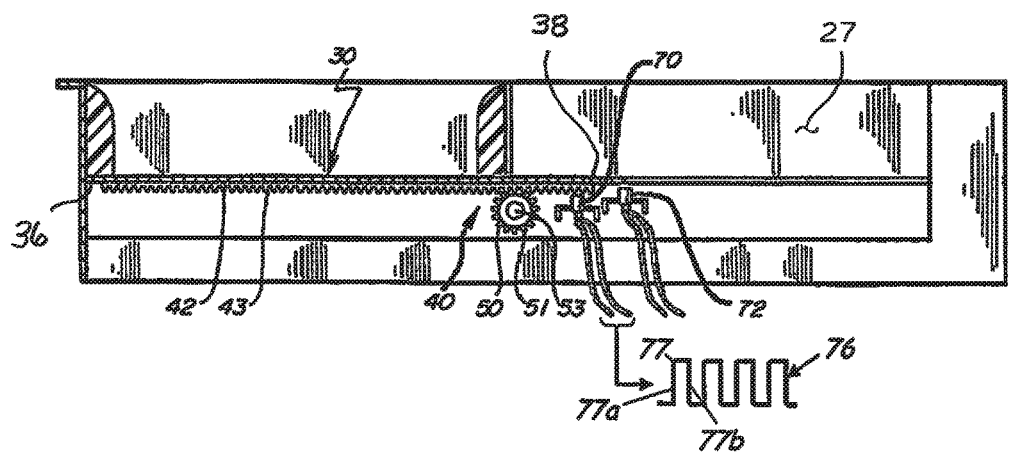
FIG. 4 is cross sectional view of the gate of FIG. 1 taken at plane 4-4 in an embodiment of the disclosure.

The gate panel 30 can be disposed within the slots 32, configured as a gate disposed within the slots 32 for translation therein between the opening 25 and the retraction bay 27 during operation. The gate panel 30 includes a first edge 36 and a second edge 38, the second edge 38 being opposite the first edge 36 as depicted in FIGS. 2, 4; and 4A. In the depicted embodiment, the first edge 36 and the second edge 38 are substantially normal to and translate parallel the slots 32, with the first edge 36 being translatable within the opening 25 and the second edge 38 being translatable within the retraction bay 27.

In one embodiment, a rack and pinion mechanism 40 is coupled to the gate panel 30 for translating the gate panel 30 within the slots 32. A motor 44 can be mounted on the exterior of the gate frame 24, the motor 44 being connected to a transmission 48. The transmission 48 can include speed reduction gearing and/or a right angle gear drive 46. In one embodiment, the transmission 48 includes a clutch that prevents the motor 44 from stalling when the gate 30 reaches an end of its stroke or when the gate 30 encounters an obstruction.

The rack and pinion mechanism 40 includes a gear rack 42 coupled with a pinion 50. The pinion 50 can be disposed at a distal end 53 of a transmission output shaft 54. The gear rack 42 includes a plurality of teeth 43 that extend therefrom. The pinion 50 also includes a plurality of teeth 51 that mesh with the plurality of teeth 43 of the gear rack 42. The gear 50 of the rack and pinion mechanism 40 is operatively coupled with the output of the transmission 48 via the transmission output shaft 54. In certain embodiments, the transmission output shaft 54 extends through the housing of the transmission 48, and a sprocket 56 is provided on the outward or proximal end 55 of the transmission output shaft 54. The sprocket 56 includes a plurality of sprocket teeth 60 and that define a plurality of gaps 62 therebetween.

Figure 3:
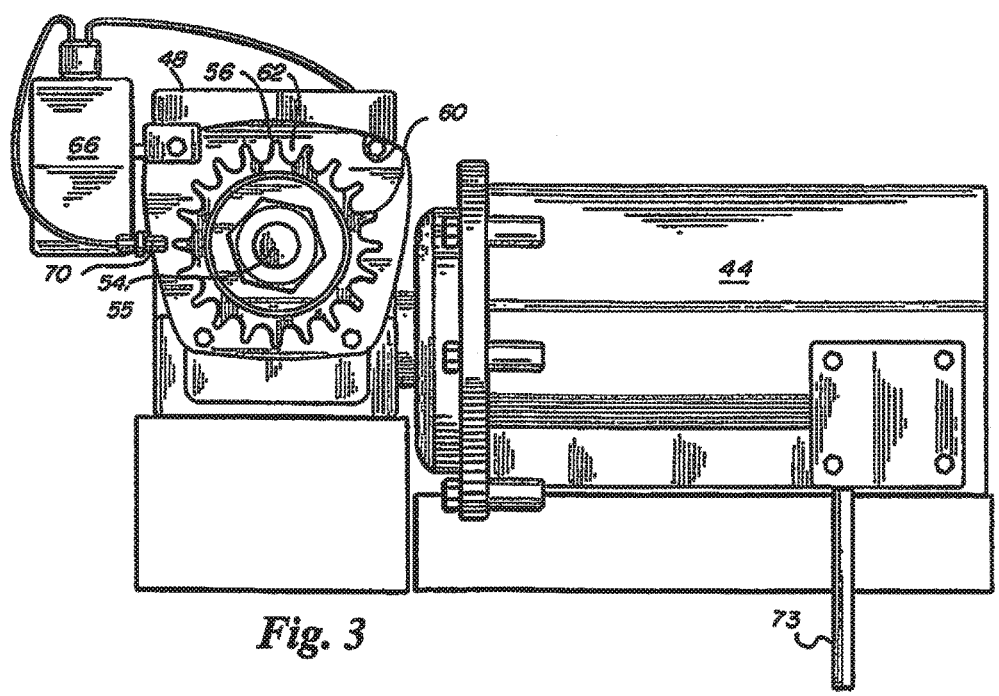
FIG. 3 is a perspective view of an inductive sensor at a sprocket associated with the transmission that drives the gate in an embodiment of the disclosure.

In various embodiments, a mobility sensor 70 can be operatively coupled with one of the various sets of plurality of teeth 43, 51 or 60 that are mobilized when the variable gate assembly 20 is opened or closed. In one embodiment, the mobility sensor 70 is operatively coupled with the plurality of teeth 43 of the gear rack 42, as depicted in FIG. 4. In another embodiment, the mobility sensor 70 is operatively coupled with the plurality of teeth 51 of the pinion 50 (not depicted). In still another embodiment, where the sprocket 56 is utilized, the mobility sensor 70 is operatively coupled with the plurality of sprocket teeth 60, as depicted in FIG. 3.

In each of these embodiments, the mobility sensor 70 is positioned to register or detect the presence of each tooth of the plurality of teeth 43, 51 or 60 as they pass by the mobility sensor 70. During movement of the gate panel 30, the repetitive presence/non-presence of the plurality of teeth 43, 51 or 60 can cause the mobility sensor 70 to generate a serial pulse train signal 76 (FIG. 4). Each pulse 77 of the serial pulse train signal 76 can be characterized as having a rising edge 77a and a falling edge 77b. The depiction of FIG. 4 presents the pulses 77 as being square pulses, but it is understood that the serial pulse train signal 76 can be of different profiles, such as a sinusoidal, triangular, or saw tooth profile.

Figure 4A:
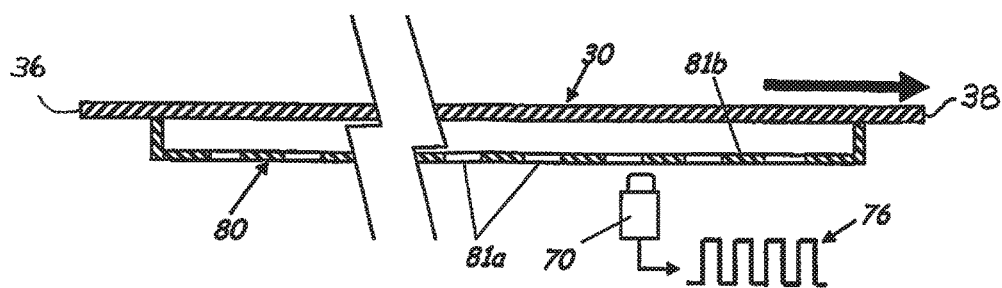
FIG. 4A is a cross sectional view of a gate panel having a passive structure for generation of a pulse train signal in an embodiment of the disclosure.
Figure 5:
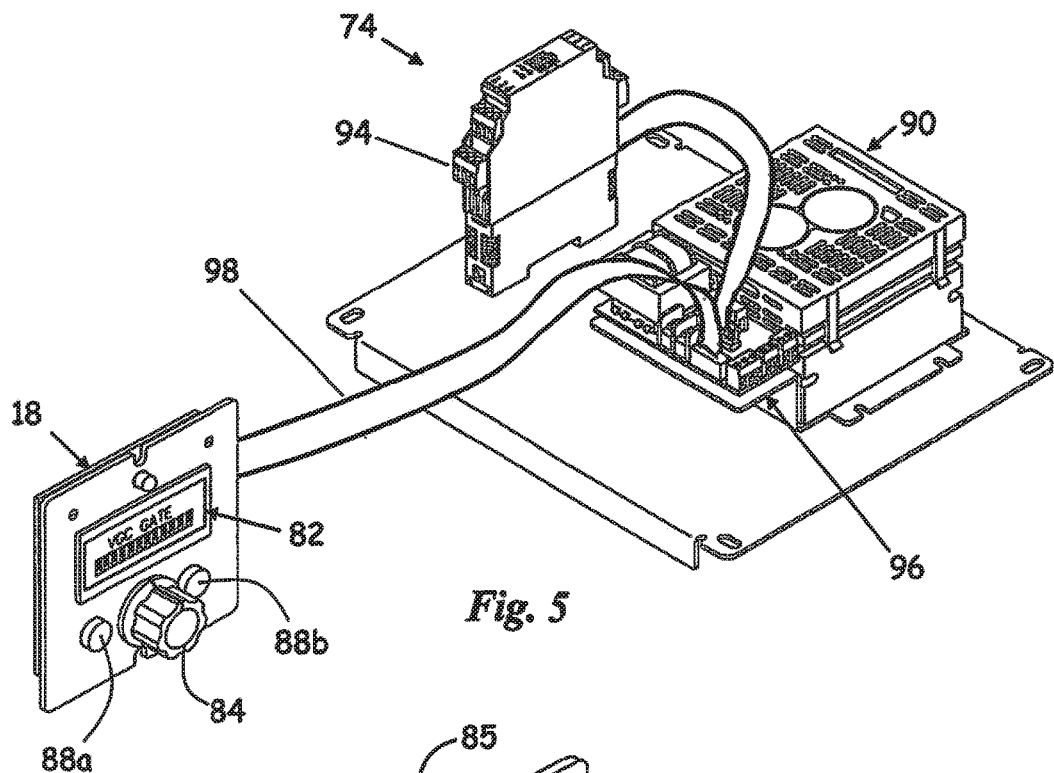
FIG. 5 is a perspective view of a user interface and drive package in an embodiment of the disclosure.
Figure 6:
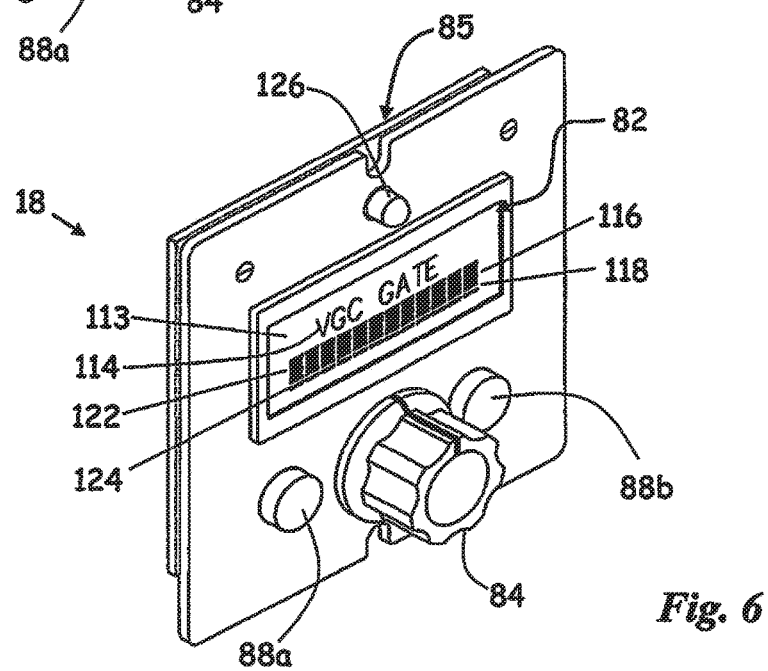
FIG. 6 is a perspective view of the user interface of FIG. 5 in isolation.

In one embodiment, a passive linear structure 80 for generating the serial pulse train signal 76 is depicted in an embodiment of the disclosure (FIG. 4A). The passive linear structure 80 can be operatively coupled to the gate panel 30, such as by direct mounting as depicted in FIG. 4A. The passive linear structure 80 includes structure, such as apertures 81a that are formed in a plate 81b, that alternately provide a presence and a non-presence for sensing by the mobility sensor 70.

The passive linear structure 80 is so named because it is not part of the active drive mechanism; rather, it passively rides along with the gate panel 30. Such structure is useful where the drive mechanism does not require gear teeth or other structure that can provide presence/no-presence for sensing by the mobility sensor 70. For example, certain hydraulically driven mechanisms would not provide a presence/no-presence structure, to which the mobility sensor 70 could be coupled. The passive linear structure 80 can be mounted to the panel gate 30 to provide generation of the pulse train 76 as it passes by the mobility sensor 70. It is noted that the sprocket 56 is also a "passive" structure, as it is not required to drive the panel gate 30.

For the embodiments depicted herein, mechanical movement of the gate panel 30 is provided by the motor 44, such as a three phase ½ horsepower motor. It is understood that alternative mobilization sources can be utilized to translate the gate panel 30, such as a pneumatic source or a hydraulic source. Such alternative sources can be fitted with an intermittent presence/no presence structure (e.g., a plurality of teeth provided by a sprocket on a rotating member or on gear rack attached to the gate panel) that can be coupled with the mobility sensor 70 to provide the serial digital pulse train signal 76 during movement of the gate panel 30.

A panel proximity sensor 72 can be operatively coupled with the gate panel 30 to register or detect the presence or lack of presence of the gate panel 30. The panel proximity sensor 72 can be configured as a "gate-closed" sensor, such as depicted in FIG. 4, wherein the panel proximity sensor 72 is positioned so that the lack of presence of the gate panel 30 is detected only when the gate panel 30 is in the fully closed position (i.e., completely obstructs the opening 25 within the gate frame 24—the far left position as shown in FIG. 4). Alternatively, the panel proximity sensor 72 can be configured as a "gate-open" sensor, wherein the panel proximity sensor 72 is positioned so that the lack of presence of the gate panel 30 is detected only when the gate panel 30 is in the fully opened position.

In one embodiment, a drive package 74 interfaces with the motor 44 and the sensors 70, 72 for control of the variable gate assembly 20. The drive package comprises an inverter motor controller 90. Optionally, the drive package 74 can include barrier relays 94 that receive the input from the sensors 70, 72. Barrier relays 94 can be utilized in potentially explosive (e.g., particle-laden) environments for intrinsic safety. A power cable 73 connects the motor 44 to the drive package 74. The sensors 70 and 72 can include leads that extend to a junction box 66 for coupling with the drive package 74, and can be coupled to sensor cables 78 that extend from the junction box 66. In other embodiments, the sensors 70 and 72 can include or be coupled with a telemetry device (not depicted) for wireless coupling to the drive package 74. In one embodiment, the circuitry 96 includes a local microprocessor for communication with external devices.

The operator interface 18 can be operatively coupled with the drive package 74. In certain embodiments, the operator interface 18 can variously include a display screen 82, a potentiometer 84, control circuitry 85, and momentary contact switches 88a and 88b. The operator interface 18 can be connected to the drive package 74 via a ribbon cable 98. To control of the variable gate assembly 20, the control circuitry 85 of the operator interface 18 can include a central controller such as a programmable microprocessor 100 that includes a CPU 102 (central processing unit), a non-transitory computer-readable memory 104 (e.g., a programmable read-only memory, or PROM), a non-transitory status register 106, and a non-transitory read/write memory 108 (e.g., a random access memory, or RAM). In one embodiment, the CPU 102, memories 104 and 108, and the status register 106 of the microprocessor 100 can be integrated into a single microchip, as depicted in FIGS. 7 and 7A. A non-limiting example of such an integrated microchip is the PIC18F4520, available from Microchip Technology Inc. of Chandler, Ariz., USA.

The computer-readable memory 104 can include one or more algorithms executed by the CPU 102. The algorithm or portion thereof that is executed can be a function of the status of the variable gate assembly 20, as indicated by the status register 106. The read/write memory 108 can be utilized for storage and retrieval of data during operation of the variable gate assembly 20.

It is noted that, while the depicted embodiment shows segregated memories from the computer-readable memory 104 to store instructions for the CPU 102 and the read/write memory 108 for storing and reading data, other embodiments can utilize one contiguous non-transitory computer memory (e.g., a RAM) that serves both functions.

Referring to FIG. 8, a schematic of a control kit 110 suitable for retrofitting to existing grain elevator gate assemblies to upgrade to the variable gate assembly 20 is presented for various embodiments. In one embodiment, the control kit 110 includes the operator interface 18 (with microprocessor 100), the mobility sensor 70, and a set of non-transitory installation instructions 112 on a tangible medium, such as written instructions on a piece of paper, computer-readable instructions on a compact disk, or computer-readable instructions on a server accessible over the internet. The control kit 110 can optionally include the inverter motor controller 90 and barrier relays 94, with attendant directions on the installation instructions 112 for coupling the inverter motor controller 90 to the motor 44 and the operator interface 18. The control kit 110 can also optionally include appurtenances for connecting the operator interface 18 to the inverter motor controller 90, such as the ribbon cable 98, the junction box 66, and miscellaneous fasteners, clamps and fittings (not depicted).

In one embodiment, the control kit 110 includes the sprocket 56, with the installation instructions 112 including directions for installing the sprocket 56 to the output shaft 54. The installation instructions 112 can include directions for operatively coupling the mobility sensor 70 with one of the plurality of teeth 43, 51, or 60 such that the mobility sensor 70 generates the serial pulse train signal 76 during movement of the gate panel 30 (FIG. 4). The installation instructions 112 can also include directions for coupling the mobility sensor 70 with the operator interface 18, and for coupling the operator interface 18 with the motor 44.

The control kit 110 can further include the gate mobility sensor 72. The installation instructions 112 can further directions for operatively coupling the gate mobility sensor 72 with the microprocessor 100 and operatively coupling the gate mobility sensor 72 with the gate panel 30 of the variable gate assembly 20 for detecting when the gate panel 30 is in the fully closed position.

The display screen 82 can comprise an LCD information screen. A labeling zone 113 of the display screen 82 can be designated for presentation of a gate name 114 for the particular gate being controlled. Graphing zones 116 and 118 of the display screen 82 can be designated for presentation of a first bar graph 122 and a second bar graph 124, respectively. The momentary contact switches 88a and 88b can be push button switches designated as a "close" switch and an "open" switch, respectively. In one embodiment, closure of the momentary contact switches 88a and 88b are sensed only as long as the push button switch is depressed; in other embodiments, the contact switches 88a and 88b can be configured to latch upon contact, only to be unlatched upon actuation of the other of the contact switches 88b or 88a. In one embodiment, the "close" switch 88a is the default position (i.e., a position assumed upon power up and/or reset), so that the variable gate assembly 20 is always in a closed gate mode or an open gate mode. Upon latching of either momentary contact switch 88a or 88b, a respective status bit or "flag" of the status register 106 is set and the complementary switch 88b or 88a is reset.

In one embodiment, a gate positioning indicator 126 can be disposed on the operator interface 18. The gate positioning indicator 126 can be a dual-colored light emitting diode (LED) that illuminates in one color (e.g., green) with the variable gate assembly 20 is closed and another color (e.g., red) when the variable gate assembly 20 is not closed. In one embodiment, the gate positioning indicator 126 can include a third color (e.g., yellow) to indicate a third state (e.g., that the variable gate assembly 20 is in transition to a newly specified position, or that the variable gate assembly 20 is being controlled remotely and the operator interface 18 is locked out). It is noted that LEDs can generate a third color by illuminating two colors simultaneously (e.g., illumination of red light and green light simultaneously generates a yellow light).

Optionally, or in addition, the momentary contact switches 88a and 88b can comprise a transparent or translucent material with a backlight mounted therein, and can illuminate in a unique color by virtue of the backlight or the switch material upon activation (e.g., green for the close switch 88a and red for the open contact switch 88b).

The potentiometer 84 can be manually adjusted by an operator to indicate a desired position of the gate panel 30 within the opening 25. For example, the operator interface 18 can be configured to indicate a fractional position of the panel gate 30, such as a desired open fraction FD of the opening 25 that is to remain unobstructed by the gate panel 30. In one embodiment, the potentiometer 84 can be an analog device (e.g., rheostat), such that the control circuitry 85 of operator interface 18 or of the circuitry 96 provides analog signals.

In one embodiment, the potentiometer 84 can be selectively bypassed and the desired position set by the PLC 19 or other remote communication device, such as a personal computer or other computer based console. The PLC 19 can be coupled to the microprocessor 100 via a separate communications port, and the CPU 102 locks out or otherwise ignores the position of the potentiometer 84, instead accepting the desired position indications from the PLC 19. The CPU 102 continues to accept the desired position from the PLC 19 or other remote communication device until the PLC 19 relinquishes control of the operator interface 18. The PLC can send a fractional position as the desired position, or a position index N to which the gate is to be controlled.

It is noted that, while the embodiments depicted herein are directed to controlling a fractional position that is an open fraction of the gate, the controlled fractional position can alternatively be a "closed" fraction (i.e., the fraction of the opening 25 that is obstructed by the gate panel 30). Accordingly, a "desired fractional position" and an "actual fraction fractional position" can alternatively be directed to the fraction of the opening 25 that is obstructed by the gate panel 30. Furthermore, the fractional position of the variable gate assembly 20 can be "static", i.e., held in a given position indefinitely.

In operation, power is transmitted to the gear 50 of the rack and pinion mechanism 40 via the transmission 48 and output shaft 54, which translates the gear rack 42 and the gate panel 30 attached thereto. Rotation of the motor 44 and transmission 48 is sensed by the mobility sensor 70. The output of the mobility sensor 70 comprises a series of pulses that, for example, as depicted in FIG. 4, is in a high state as a given tooth of the plurality of teeth 43, 51 or 60 pass in close proximity to the mobility sensor 70, and is in a low state as the gap between adjacent teeth of the plurality of teeth 43, 51 or 60 pass the mobility sensor 70.

In general, the microprocessor 100 keeps track of the direction of the translation of the gate panel 30 as well as a position index N that corresponds to the position of the gate panel 30 based on the pulses generated by the mobility sensor 70 and counted by the CPU 102. The position index N is defines the actual position of the gate panel 30 in terms of the number of pulse counts that would be counted if the gate panel 30 were moved from either the fully closed position or the fully open position directly to the position actual position. Accordingly, the position index is an integer representation of the position of the panel gate that ranges from one to a maximum position index number Nmax, where Nmax represents one of either the fully opened position or the fully closed position. The position index N is compared with the maximum position index number Nmax to determine an actual open fraction FA of the opening 25 that is to remain unobstructed by the gate panel 30. Acquisition of the maximum position index number Nmax and tracking of the position index N is detailed below.

Figure 9:
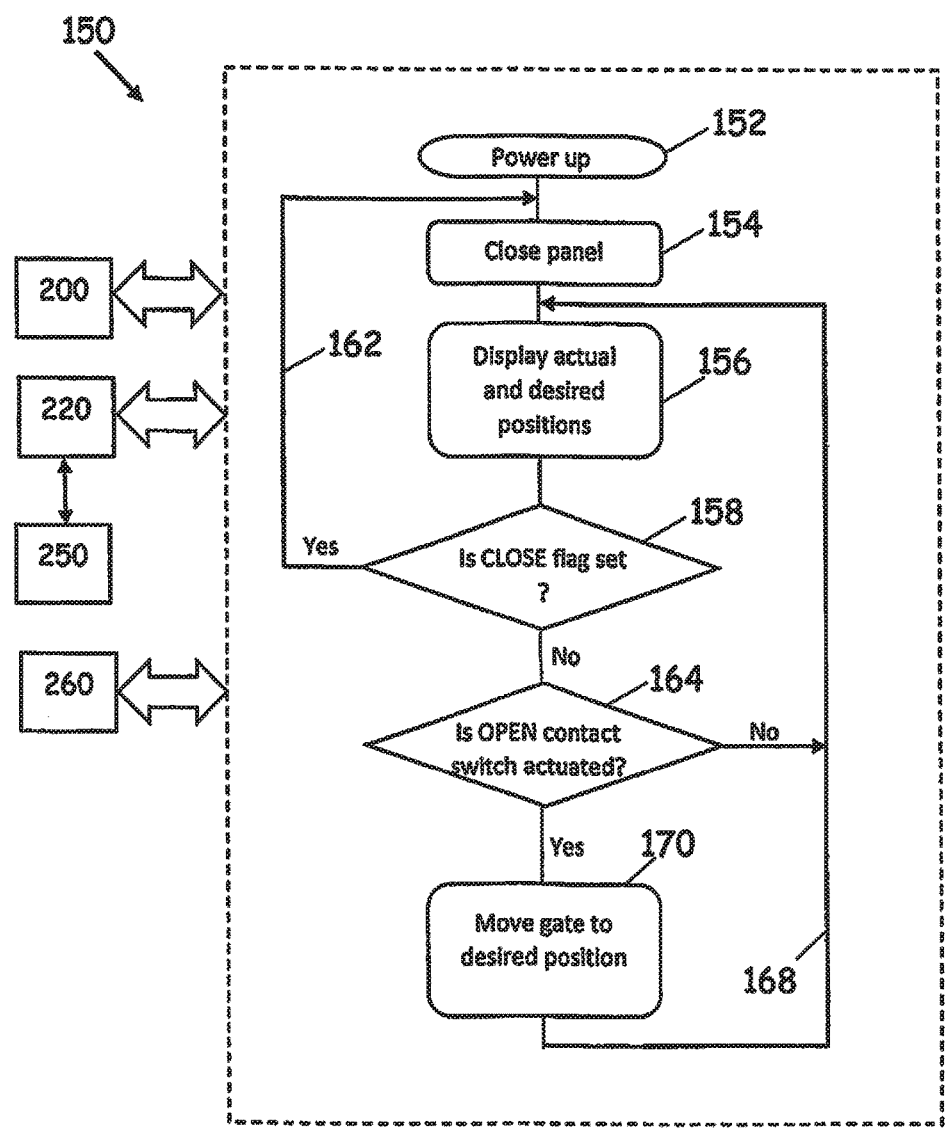
FIG. 9 is a flow chart of a main control algorithm for operation of a variable gate control in an embodiment of the disclosure.

Referring to FIG. 9, a main control algorithm 150 is depicted in an embodiment of the disclosure. The main control algorithm 150 can be initiated upon power up of the operator interface 18 (step 152). Upon power up, the main control algorithm 150 initiates a subroutine that fully closes the gate panel 30 of the control gate assembly 20 (step 154). If the gate panel 30 is already closed, the close gate panel subroutine at step 154 merely verifies that the gate panel 30 is in the closed position. Such verification can be affirmed by checking the status of panel proximity sensor 72.

The main control algorithm 150 can be serviced by various service interrupt routines, depicted as being interfaced to the main control algorithm 150 with double block arrows. The service interrupt routines can perform functions such as tracking the position index N (routine 200, described below) and checking the period of the pulses received from the mobility sensor 70 (routine 220, discussed below). In one embodiment, the status of the panel proximity sensor 72 is continuously monitored via a service interrupt routine 260. If the panel proximity sensor 72 indicates an unexpected gate fully closed condition (or alternatively a gate fully open condition) during operational phases where the gate panel 30 is supposedly not fully closed (or fully open), the continuous proximity sensor monitor can generate an error condition and/or reset the position index N to zero (or to Nmax).

The main control algorithm 150 also displays the actual position of the gate panel 30 within the variable gate assembly 20 (e.g., the actual open fraction FA) and the desired position (e.g., the desired open fraction FD) (step 156), the desired position being set by the potentiometer 84. Immediately after execution of the close gate panel subroutine at step 154, the actual open fraction FA will be 0%, but the actual open fraction FA can change thereafter and, if so, is updated by step 156 within loop 168.

The main control algorithm 150 can determine whether a CLOSE flag is set (step 158) (Alternatively, step 158 can instead interrogate whether the close contact switch 88a is actuated.) The "CLOSE flag" can be a designated bit in the status register 106 that is set if the close momentary contact switch 88a was the last of the momentary contact switches 88a and 88b to be actuated. In embodiments where the momentary contact switches 88a and 88b are latched, the designated bit in the status register 106 can be reset if the close momentary contact switch 88a is not latched. If the CLOSE flag is set, main control algorithm 150 loops back to the close gate panel subroutine at step 154 and display subroutine at step 154 (loop 162). In one embodiment, the main control algorithm 150 remains within loop 168 as long as the CLOSE flag is set.

If the CLOSE flag is not set, the main control algorithm 150 determines whether the open contact switch 88b is actuated (step 164). If the open contact switch 88b is not actuated, the main control algorithm 150 loops back to the display subroutine at step 156.

If the open contact switch 88b is actuated at step 164, the main control algorithm 150 executes a gate control algorithm 170 that moves the gate (panel 30) towards a position that corresponds to the desired open fraction FD indicated by the potentiometer 84 or a remote device such as the PLC 19. The gate control algorithm 170 can be executed within a larger loop 168 that continuously updates the display panel 82 (step 156) and intermittently checks the status of the CLOSE flag (step 158) and whether the open contact switch 88b is actuated (step 162).

In some embodiments, depression of the open contact switch 88b can also cause the CPU 102 to set an "OPEN flag" bit in the status register 106 (which the CPU 102 resets when the close contact switch 88a is actuated); if so, the OPEN flag bit can be checked instead of the open contact switch 88b. In other embodiments, where actuation of the open contact switch 88b is latched, the CPU 102 can check whether the latching of the open contact switch 88b is set. Accordingly, in addition to checking whether the close contact switch 88a is actuated, the various embodiments disclosed herein can also check whether the close contact switch 88a was the most recently actuated of the momentary contact switches 88a and 88b.

Figure 10:
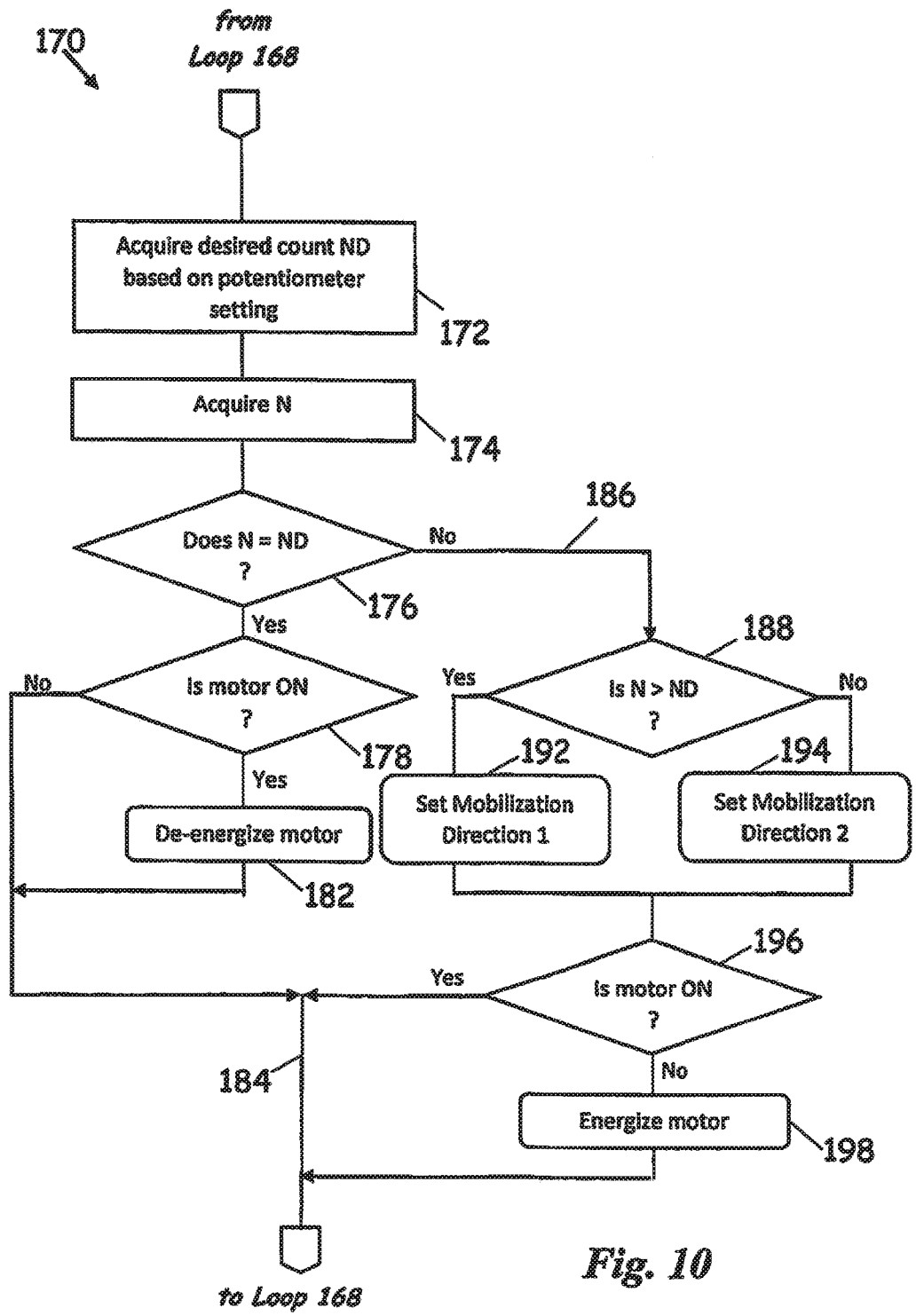
FIG. 10 is a flow chart of a gate control algorithm for operation of a variable gate control in an embodiment of the disclosure.

Referring to FIG. 10, a flow chart of a gate control algorithm 170 of the operation of the variable gate assembly 20 is depicted in an embodiment of the disclosure. The various steps of the gate control algorithm 170 can be provided in the computer-readable memory 104 for access and execution by the CPU 102. In one embodiment, the gate control algorithm 170 acquires a desired position index ND, defined as the desired number of pulse counts that would be counted if the gate were moved from either the fully closed position or the fully open position directly to the position that provides the desired open fraction FD (step 172). (Various methods for determining the desired position index ND are presented below, attendant to the discussion of FIG. 12.) The gate control algorithm 170 also acquires the actual position index N, defined as the number of pulse counts that would be counted if the gate were moved from either the fully closed position or the fully open position directly to the current position (step 174). (A method for tracking the value of N is presented below, attendant to the discussion of FIG. 11.)

The gate control algorithm 170 determines whether the actual position index N is equal to the desired position index ND (step 176). If so, a check can be performed to determine whether the motor 44 is on (step 178), and, if so, the motor 44 de-energized (step 182). Alternatively, the gate control algorithm 170 can execute a de-energization of the motor 44, which, in certain embodiments, is simply and harmlessly redundant if the motor 44 is already de-energized. After de-energization of the motor 44 is established, gate control algorithm 170 branches back to the main control algorithm 150 (branch 184).

If the actual position index N is not equal to the desired position index ND, the gate control algorithm 170 enters an active positioning branch (branch 186) to move the gate panel 30 towards the desired position. In branch 186, the gate control algorithm 170 determines whether the actual position index N is greater than the desired position index ND (step 188). If so, a first mobilization direction (e.g., a first rotational direction of the motor 44) is set (step 192); if not, a second, opposing mobilization direction (e.g., a second rotational direction of the motor 44) is set (step 194). Here, the first mobilization direction represents moving the gate panel 30 toward the fully closed position (i.e., reducing the actual open fraction FA of the gate), and the second mobilization represents moving the gate panel 30 toward the fully open position (i.e., increasing the actual open fraction FA of the gate). A check can be performed to determine whether the motor 44 is energized (step 196), and, if not, the motor 44 energized (step 198). Alternatively, the gate control algorithm 170 can execute an energization of the motor 44, which, in certain embodiments, is simply and harmlessly redundant if the motor 44 is already energized. After energization of the motor 44 is established and the attendant movement of the gate panel 30 in the proper direction, the gate control algorithm 170 branches back to the main control algorithm 150 (branch 184).

Figure 11:
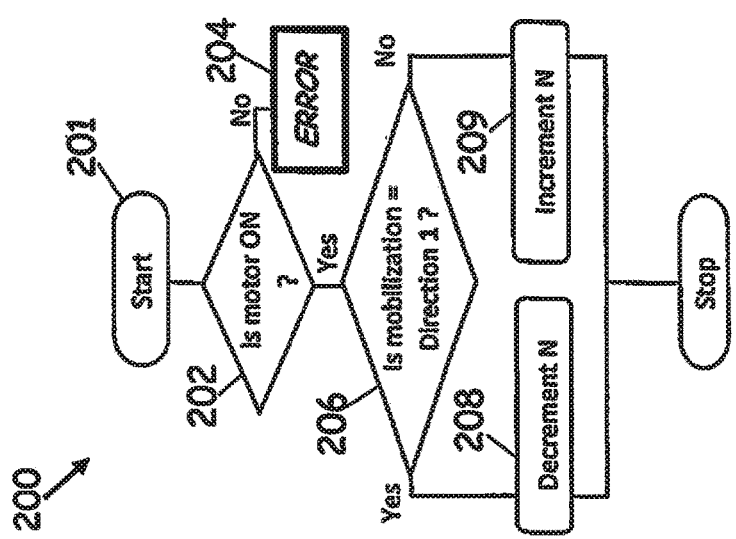
FIG. 11 is a flow chart of a position index tracking algorithm in an embodiment of the disclosure.

Referring to FIG. 11, a position index tracking algorithm 200 is depicted in an embodiment of the disclosure. The position index tracking algorithm 200 can be a service interrupt routine, as depicted in FIG. 9, that is initiated any time a pulse is detected by the CPU 102 (step 201). In one embodiment, a check is made to determine if the motor 44 is energized (step 202). The check at step 202 can be done one of several ways, including determining the presence of current being carried by cable 73 to the motor 44, or by the setting of a designated bit in the status register 106. If the motor is not energized, the detected pulse is erroneous, and an error condition is set. In certain embodiments, the error condition can generate a visual indication on the display 82 of the operator interface 18, such as a message sent to the labeling zone 113 (not depicted).

If the motor is running, the index tracking algorithm 200 checks the direction of the mobilization of the gate panel 30 (step 206). The check can be made, for example, by checking a designated bit of the status register 106 that is maintained by the CPU 102. Depending on the direction of the mobilization, the actual position index N is either decremented (step 208) or incremented (step 209). For positioning systems based on the open fraction, movement towards the fully closed position is reflected by decrementing the actual position index N, and movement towards the fully open position is reflected by incrementing the actual position index N. The incrementation or decrementation of the position index N effectively updates the value of N, which is available to other subroutines.

Figure 12:
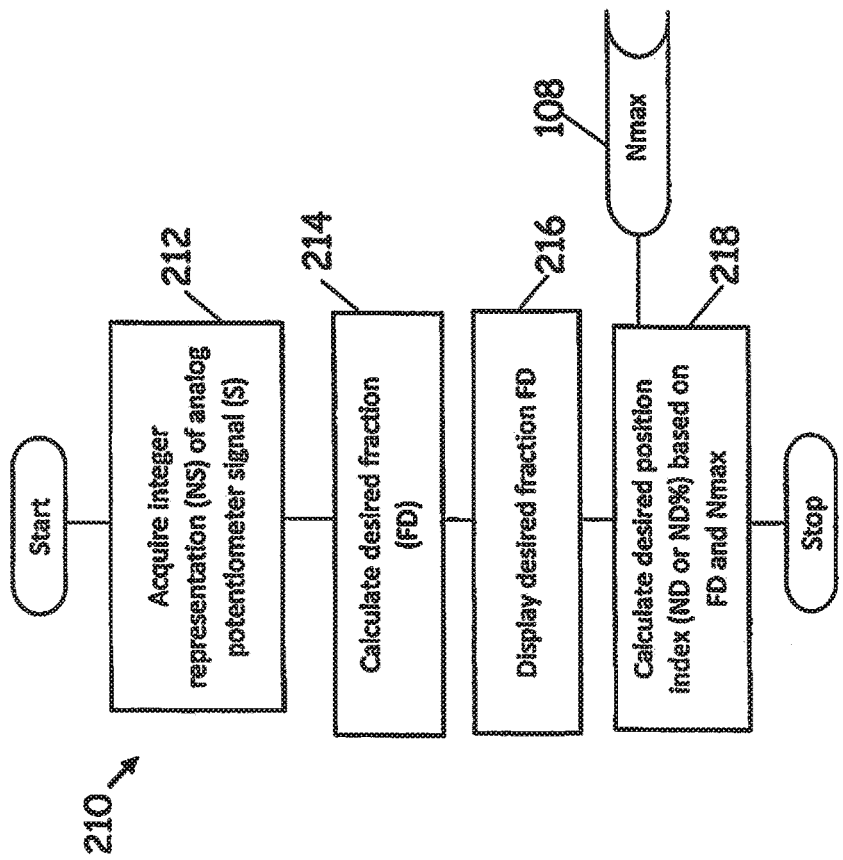
FIG. 12 is a flow chart of an algorithm for calculating a desired open fraction and a desired position index from a potentiometer input in an embodiment of the disclosure.

Referring to FIG. 12, a conversion algorithm 210 for calculating a desired open fraction and a desired position index from the position of the potentiometer 84 is depicted in an embodiment of the disclosure. The conversion algorithm 210 can be called from the main control algorithm 150, for example at step 156. In the depicted embodiment, the conversion algorithm 210 acquires an integer representation NS of the analog signal S being output by the potentiometer 84 (step 212). The desired fraction FD is calculated (step 214) and displayed (step 216). Display of the desired fraction FD can be in the form of a bar graph on the user interface 18 (FIGS. 13A through 13C) or can be in the form of a posted percentage (FIGS. 14A through 14C).

The desired position index ND can also be calculated based on the desired open fraction FD and the maximum position index number Nmax. The value of Nmax can be independently determined and entered manually into the read/write memory 108, or can be determined by a separate control algorithm (e.g., a maximum index counting algorithm 270, discussed attendant to FIG. 17) and stored in the read/write memory 108 for later retrieval.

Alternatively, at step 212, the integer representation NS can be established by the PLC 19 or other remote, computer-based device. In some embodiments, the desired fraction FD can be supplied directly by the PLC 19 (step 214).

In operation, the operator sets the desired open fraction FD by adjusting the potentiometer 84 to generate the intermediate signal S that corresponds to the desired open fraction FD (step 174). Based on the intermediate signal S, the fully closed position signal S1, and the fully open position signal S2, the desired open fraction FD is calculated (step 176). In various embodiments, the desired open fraction FD is continuously presented on the display screen 82, including during the adjustment of the potentiometer 84 by the operator.

In various embodiments, the desired open fraction FD is continuously updated and presented on the display screen 82, including during the adjustment of the potentiometer 84 by the operator. Likewise, the actual open fraction FA can be continuously updated and presented on the display screen 82, including during the mobilization of the gate panel 30.

The analog signals received from the potentiometer 84 can be representative of the gate panel 30 in a fully closed position (signal S1), a fully open position (signal S2), and the desired intermediate position (signal S). The analog signals are conditioned, for example by A/D conversion, for reading by the CPU 102. Based on the analog signals S1, S2, and S, the desired open fraction FD of the opening 25 as regulated by the gate panel 30 is calculated by the CPU 102.

The desired open fraction FD can be, but is not required to be, computed as follows:

$$FD = S - S1/S2 - S1 \qquad \text{Eq. (1)}$$

In one embodiment, the desired open fraction FD is displayed on the display screen 82 of the operator interface 18. A corresponding desired position index ND can then be calculated from the desired open fraction FD:

$$ND = FD \cdot N\text{max} \qquad \text{Eq. (2)}$$

For various embodiments, the various analog signals S, S1, and S2 are converted to integer representations NS, N1, and/or N2 for use by the microprocessor 100. In some embodiments, the integer representations N1 and N2 are not acquired or implemented; instead, the desired open fraction is calculated from the integer representation NS of the analog signal S:

$$ND = NS/2^n \qquad \text{Eq. (3)}$$

where n is the bit resolution of the A/D converter. In one embodiment, ND is represented as a percentage ND %:

$$ND\% = ND \cdot 100\% \qquad \text{Eq. (4)}$$

Other simplifications for acquiring ND and/or ND % can also be implemented. For example, for systems where the bit resolution n of the A/D conversion is 10 bits, the resolution of the integer representation NS is 1024 counts, or approximately 1000. Accordingly, the desired position index ND can be approximated as $$ND = NS/1000 \qquad \text{Eq. (5)}$$

and the corresponding percentage approximated as $$ND = NS/10 \qquad \text{Eq. (6)}$$

Referring to FIGS. 13A through 13C, various aspects of the operator interface 18 are depicted during an operation sequence in an embodiment of the disclosure. In FIG. 13A, the gate panel 30 of the variable gate assembly 20 is closed, the gate positioning indicator 126 is green (indicating that the variable gated assembly 20 is in closed gate mode), and the potentiometer 84 is set to about 55 percent. It is noted that, in this configuration (i.e., in the closed gate mode), adjustment of the potentiometer 84 will cause the second bar graph 124 to change, but the gate panel 30 of the variable gate assembly 20 does not move, and therefore the display of the first bar graph 122 remains in the closed indication. Accordingly, any adjustment of the potentiometer 84 acts only to pre-set a desired gate position.

In FIG. 13B, the open momentary contact switch 88b is actuated, causing the gate positioning indicator 126 to illuminate in a red color. The depiction of FIG. 13B illustrates the operator interface 18 after the variable gate assembly 20 has executed control to be configured with the actual open fraction FA to within the positioning resolution of the desired open fraction FD. In the depiction of FIG. 13B, the second bar graph 124 represents the desired open fraction FD as set by the potentiometer 84, and extends from left to right as viewed by the operator; the first bar graph 122 represents the complement of the actual open fraction FA as tracked by microprocessor 102, and extends from right to left as viewed by the operator. Accordingly, the first bar graph 122 effectively represents the actual closed fraction of the variable gate assembly 20.

To arrive at the configuration of FIG. 13C from FIG. 13B, the potentiometer 84 is readjusted to dial in an open fraction of 5%. Upon readjustment of the potentiometer 84, the CPU 102, operating the main control algorithm 150, detected a difference between the actual position index N and the new desired position index ND at step 170. The gate positioning algorithm at step 170 then adjusted the gate panel 30 so that the actual position index N again equaled the desired position index ND. During the repositioning of the gate panel 30, the gate positioning indicator 126 remains red.

In the depictions of FIGS. 13A through 13C, the first bar graph 122 can be characterized as having a fixed end 122a and a variable end 122b. Likewise, the second bar graph 124 can be characterized as having a fixed end 124a and a variable end 124b. For the embodiment depicted in FIGS. 13A through 13C, the fixed end 124a of the second bar graph 124 is at the left extreme of the graphing zone 118 as viewed by the operator, and represents a 0% open (i.e., a fully closed) position; the fixed end 122a of the first bar graph 122 is at the right extreme of the graphing zone 116 as viewed by the operator, and represents a 0% closed (i.e., a fully open) position. The variable end 124b of the second bar graph 124 represents the desired open fraction FD and, when the fully opened position is the desired position for the gate panel 30 of the variable gate assembly 20, the second bar graph 124 can extend the full width of the graphing zone 118 so as to be aligned with the fixed end 122a (0% closed position) of the first bar graph 122. Similarly, the variable end 122b of the first bar graph 122 represents the complement of the actual open fraction FA and, when the gate 30 is in fully closed position, the first bar graph 122 can extend the full width of the zone 116 so as to be aligned with the fixed end 124a (0% open position) of the second bar graph 124. In this manner, the variable ends 122b and 124b of the bar graphs 122 and 124, though representing complementary quantities (i.e., the actual closed fraction and the desired open fraction, respectively), are in alignment on the display screen 82 when the desired position index ND is equal to the actual position index N.

Referring to FIGS. 14A through 14C, an alternative arrangement for the display screen 82 is presented in an embodiment of the disclosure. In this embodiment, instead of displaying bar graphs, the display screen 82 is arranged to post the desired open fraction FD on the left and the actual open fraction FA on the right. Otherwise, the scenario from FIGS. 14A through 14C is the same as described for FIGS. 13A through 13C.

In some embodiments (not depicted), both the bar graphs 122, 124, as well as the fractional display of the desired open fraction FD and the actual open fraction FA, can be simultaneously displayed on the display panel 82. To accommodate both may require increasing the size of the display panel or using an LCD display with enhanced resolution.

At any time during the sequence of FIGS. 13A through 13C or FIGS. 14A through 14C, actuation of the close momentary contact switch 88a would cause the CPU 102 to move the gate panel 30 of the variable gate assembly 20 to the fully closed position and to change the color of the gate positioning indicator 126 (e.g., from red to green). Further movement of the gate panel 30 would be precluded until the open momentary contact switch 88b is actuated.

It is noted that the CPU 102 and/or the computer-readable memory 104 containing the instructions executed by the CPU 102 do not have to be housed in the operator interface 18. In some embodiments, the CPU 102 and memories 104, 108 are provided as part of the circuitry 96 of the drive package 74, for interface and control with a remote controller sans the operator interface 18, such as a PLC, programmable gate controller, or general purpose computer.

Referring to FIG. 15, a flow chart for a pulse check algorithm 220 is depicted in an embodiment of the disclosure. During movement of the gate panel 30, the signal generated by the mobility sensor 70 is a series of pulses, such as the serial pulse train signal 76 of FIG. 4, that are counted by the CPU 102. In various embodiments, when the motor is energized and movement of the gate panel 30 is anticipated, the period between respective pulses (Tpulse) of the pulse train signal 76 is monitored by the CPU 102 by implementation of the pulse check algorithrm 220. The pulse check algorithm 220 can be configured as a service interrupt routine, as depicted in FIG. 9, that is active whenever the motor is on (step 222). Functionally, the pulse check algorithm operates to detect when the period between pulses received by the mobility sensor 70 are impermissibly long, indicating an obstruction or other malfunction of the opening or closing of the gate panel 30. When the gate panel 30 is expected to be in motion and the period exceeds a predetermined value (Tmax), it is presumed that the motion of the gate panel 30 has been interrupted, for example an obstruction to the movement of the gate panel 30, and a fault condition is generated. In one embodiment, if the pulse duration time Tpulse does exceed the maximum allowable time delay Tmax, an obstruction clearing algorithm 250 attempts to enable the obstruction to pass (explained below and depicted at FIG. 16).

If the motor is energized, the pulse check algorithm 220 goes through an initiation (step 224) which can include reading a maximum allowable time delay Tmax between pulses received from the mobility sensor 70 and resetting a pulse duration metric (Tpulse) between pulses received by the mobility sensor 70. In one embodiment, a maximum allowable number of calls to the obstruction clearing algorithm (Ncall) is also read during the initiation step 224. Both Tmax and Ncall can be read from the non-transitory computer read/write memory 108. A timer is started that accrues the pulse duration time and is accumulated by the pulse duration metric Tpulse (step 226).

The pulse check algorithm 220 then enters a time tracking loop (loop 228) wherein the value of Tpulse is updated according to the elapsed time from the start of the timer (step 232). A call counter (icall) that tracks the number of calls to the obstruction clearing algorithm 250 before the obstruction clears is checked (step 234); if the call counter icall equals the a maximum allowable number of calls to the obstruction clearing algorithm Ncall, an error condition is set (step 236), wherein operation of the variable gate assembly 20 ceases and personnel are notified that the variable gate assembly 20 requires attention.

If the call counter icall is not equal to the Ncall limit (i.e., is less than Ncall), the pulse duration time Tpulse is compared to the maximum allowable time delay Tmax to infer whether the gate has stopped moving (step 238). If Tpulse exceeds Tmax, the call counter icall is incremented (step 242) and the obstruction clearing algorithm 250 implemented.

If the Tpulse does not exceed the Tmax, the pulse check algorithm 220 checks to see if a new pulse is received from the mobility sensor 70 (step 244). In one embodiment, detection of the pulse includes detection of the rising edge 77a and/or falling edge 77b of a pulse 77 received from the mobility sensor 70 (FIG. 4).

If no new pulse is received from the mobility sensor 70, the index update routine 220 loops back (loop 228) to repeat the steps of updating the Tpulse (step 232), checking the call counter icall (step 234), and checking Tpulse against Tmax (step 238). If a new pulse is received from the mobility sensor 70, the call counter icall is reset to (step 246) and the pulse check algorithm 220 is exited (step 248).

Referring to FIG. 16, a flow chart of an obstruction clearing algorithm 250 is depicted in an embodiment of the disclosure. The obstruction clearing algorithm 250 can be invoked from the index update routine 220 when the pulse duration time Tpulse exceeds the maximum allowable time delay Tmax, indicating that there is some obstruction blocking the gate from moving in the preferred direction.

Variables for control of the obstruction clearing algorithm 250 include the number of pulses NN are to be received from the mobility sensor 70 in translating the gate in the attempt to clear the obstruction. The NN variables can be read from the non-transitory computer read/write memory 108 (step 254).

The motor 44 is reversed until the number of pulses received from the mobility sensor equals NN (step 256). Then the motor 44 is returned in the original direction (i.e., the direction the motor 44 was rotating or translating when the blockage occurred), again until the number of pulses received from the mobility sensor equals NN (step 258). The obstruction clearing algorithm 250 is then terminated.

Functionally, the obstruction clearing algorithm 250 performs a reversal of the gate panel 30 so that any obstruction caught between the gate panel 30 and the gate frame 24 is freed and hopefully passes on. The gate panel 30 is restored to the original position by translating the gate panel 30 in the original direction over the same number of pulses that was performed for the reversal. Accordingly, the position index is not affected by the operation of the obstruction clearing algorithm 250.

Figure 17:
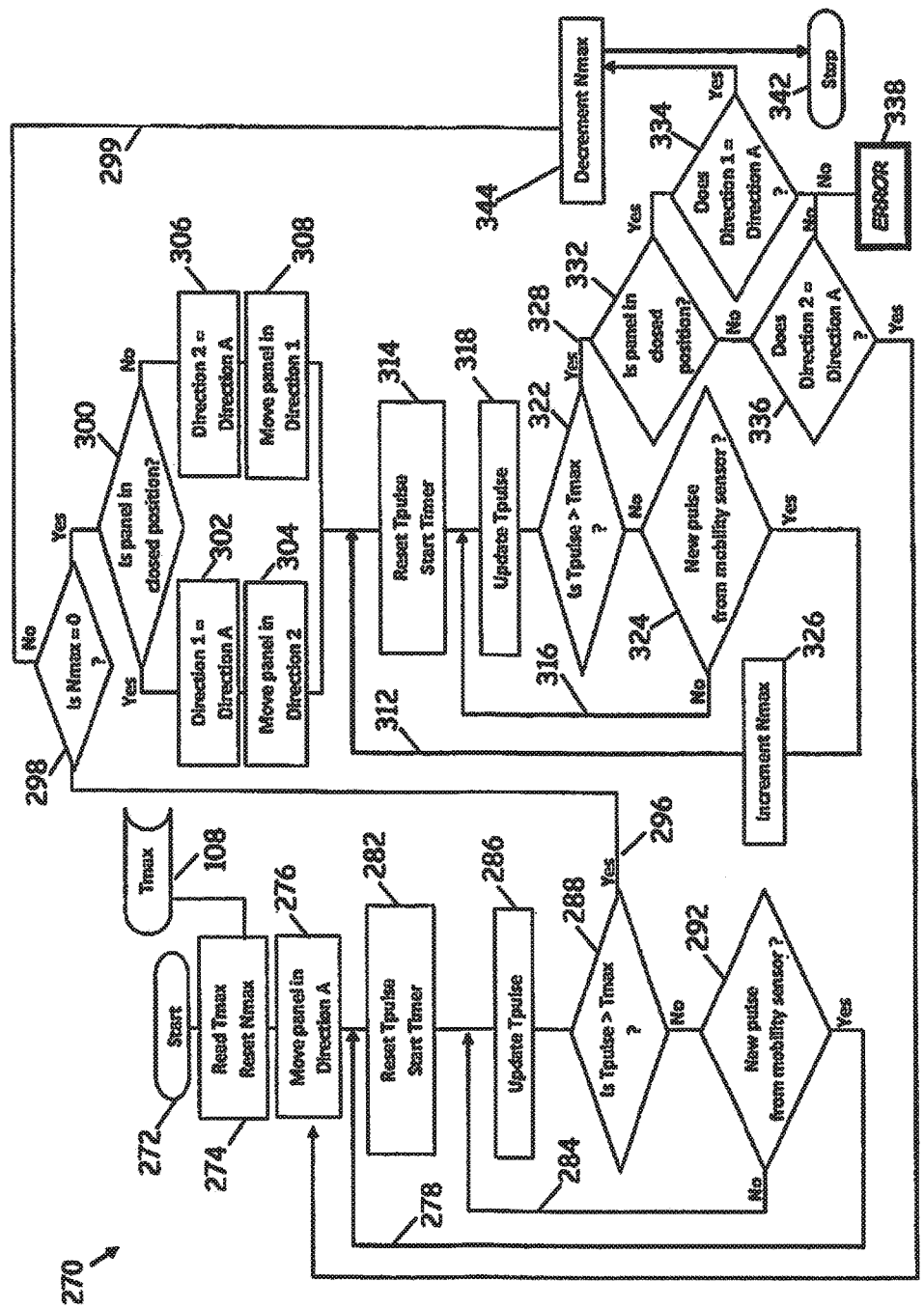
FIG. 17 is a flow chart of a maximum index counting algorithm in an embodiment of the disclosure.

Referring to FIG. 17, a maximum index counting algorithm 270 is depicted in an embodiment of the disclosure. The maximum index counting algorithm 270 is a user-initiated routine (step 272) that is run independent of the main control algorithm 150 for the purpose of establishing the value of the maximum position index number Nmax. Procedurally, the maximum index counting algorithm 270 determines which mobilization direction closes the gate panel 30, and counts the number of pulses received from the mobility sensor 70 in going from the fully open position to the fully closed position (or vice versa) to determine the maximum position index number Nmax. The maximum index counting algorithm 270 senses that the fully closed position and the fully open position have been attained by monitoring the pulse duration Tpulse; when Tpulse is greater than Tmax (i.e., when the gate "stalls"), it is presumed that the gate panel 30 has reached an end of the stroke.

In one embodiment, the wiring of the motor can be known so that the close direction (Direction 1) is predetermined. However, in other embodiments, the wiring of the motor (or configuration of the mobilization source generally) may not be known. The maximum index counting algorithm 270 can be configured to determine the directional characteristics of the mobility source during the determination of Nmax.

Structurally, the maximum counting algorithm 270 can be as follows: The value of the maximum position index number Nmax is reset to zero and the maximum allowable time delay Tmax, being stored in the non-transitory computer read/write memory 108, is made available to the maximum counting algorithm 270 (step 274). To determine the directional characteristics of the variable gate assembly 20, the gate panel 30 is first mobilized in an arbitrary direction, referred to as "direction A" (step 276). At this point in the algorithm, the routine, the direction of the mobilization (i.e., opening or closing) can be unknown. A time tracking loop (loop 278) is entered, wherein the value representing the pulse duration Tpulse is reset and the timer of the CPU 102 is started (step 282). Within the time tracking loop 278, a pulse monitoring loop (loop 284) is entered, wherein the pulse duration Tpulse is updated (step 286) and compared against the maximum allowable time delay Tmax (step 288). If Tpulse is not greater than Tmax, maximum counting algorithm 270 then checks whether a new pulse has been initiated by the mobility sensor 70 (step 292); if so, the maximum counting algorithm 270 loops into the outer time tracking loop 278 to track the next pulse; if not, the maximum counting algorithm 270 loops into the pulse monitoring loop 284 to resume monitoring of the current pulse width. If Tpulse exceeds the value of Tmax at step 288, the maximum counting algorithm 270 presumes that the gate panel 30 is has reached the end of its stroke (i.e., is in either the fully open position or in the closed position), and branches out of the time tracking loop 278 (branch 296).

It is noted that, in an alternative embodiment (not depicted), steps 282 through 292 can be replaced with a query of whether the panel proximity sensor 72 indicates that the gate panel 30 is in the closed position. Once the panel proximity sensor 72 so indicates, the maximum counting algorithm 270 can then branch to step 298 via the branch 296.

In one embodiment, the maximum counting algorithm 270 determines whether Nmax is zero (step 298); if not, it is presumed that the Nmax variable, which was reset at step 274, has been overwritten because the value of Nmax has been duly calibrated, and the maximum counting algorithm 270 is exited (branch 299) with the gate panel 30 in the fully closed position.

If Nmax is zero, it is presumed that the gate panel has only been exercised in the one direction ("Direction A"). The maximum counting algorithm 270 determines whether the panel is in the fully closed position (step 300) (or alternatively, whether the panel is in the fully opened position. The fully closed/fully opened determination can be accomplished by checking the status of the panel proximity switch 72. If the gate proximity switch 72 indicates that the panel gate 30 is in the fully closed position, "Direction A" is presumed to be the gate closing direction, or "Direction 1" for purposes the present disclosure (step 302), and the gate panel 30 is reversed (i.e., mobilized in the presumed "Direction 2", step 304); if the gate proximity switch 72 indicates that the panel gate 30 is not in the fully closed position, "Direction A" is presumed to be the gate opening direction, or "Direction 2" for purposes the present disclosure (step 306), and the gate panel 30 is reversed (i.e., mobilized in the presumed "Direction 1", step 308).

The pulse counting aspect of the maximum counting algorithm 270 is then executed. A time tracking loop (loop 312) is entered, wherein the value representing the pulse duration Tpulse is reset and the timer of the CPU 102 is started (step 314). Within the time tracking loop 312, a pulse monitoring loop (loop 316) is entered, wherein the pulse duration Tpulse is updated (step 318) and compared against the maximum allowable time delay Tmax (step 322). If Tpulse is not greater than Tmax, maximum counting algorithm 270 then checks whether a new pulse has been initiated by the mobility sensor 70 (step 324); if so, the maximum counting algorithm 270 increments the value of Nmax (step 326) and loops into the outer time tracking loop 312 to track the next pulse; if not, the maximum counting algorithm 270 loops into the pulse monitoring loop 316 to resume monitoring of the current pulse width.

If Tpulse exceeds the value of Tmax at step 322, the maximum counting algorithm 270 then branches out of the time tracking loop 312 (branch 328). The maximum counting algorithm 270 determines whether the gate panel 30 is closed by checking the status of the panel proximity switch 72 (step 332). If the gate panel 30 is closed, a check is made to determine whether Direction 1 was set to be Direction A (step 334); if so, Direction 1 was properly identified in steps 302. The maximum counting algorithm 270 is then terminated (step 342) with the gate panel 30 in the fully closed position. However, if the checks at steps 332 and 334 reveal that the gate panel 30 is in the fully closed position and Direction 1 was not equated Direction A, Direction 2 was improperly identified in steps 306, and an error condition is set (step 338).

If the gate panel 30 is not closed, a check is made to determine whether Direction 2 was set to be Direction A (step 336); if so, Direction 2 was properly identified in step 306, and, in one embodiment, steps 276 through 289 are re-executed to close the gate. The maximum counting algorithm 270 is then terminated via the check of the Nmax variable at step 298.

However, if the checks at steps 332 and 336 reveal that the panel is not closed and Direction 2 was not equated with Direction A, Direction 1 was improperly identified at step 306, and an error condition is set (step 338).

In one embodiment, the value of Nmax is decremented prior to exiting the maximum counting algorithm 270. The value of Nmax can establish the maximum allowable value for the position index N, and decrementation helps prevent the gate panel 30 from contacting the gate frame 24 and stalling during normal operation, which can lead to false indications of an obstruction or other error.

Figure 18:
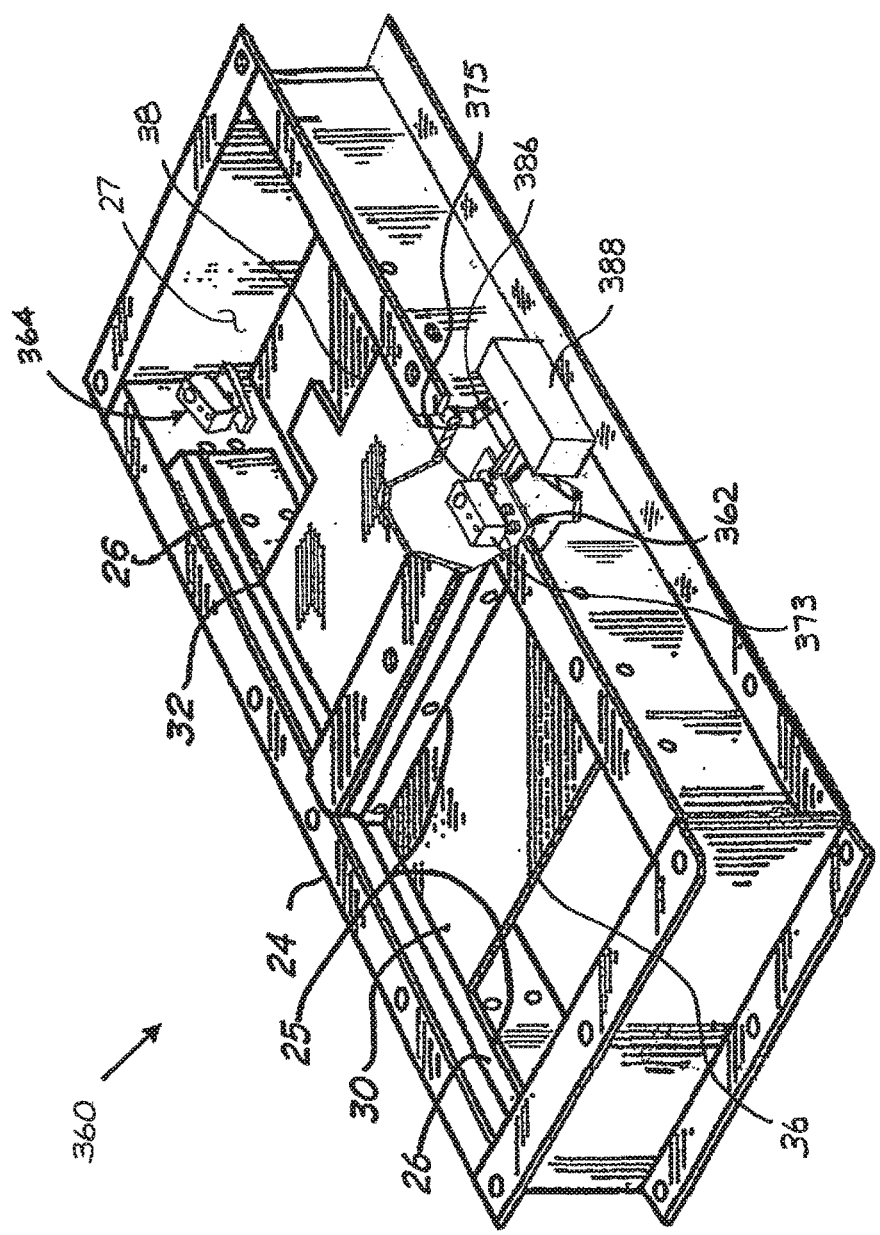
FIG. 18 is a partial cutaway perspective view of a gate assembly with anti-fouling proximity sensors in an embodiment of the disclosure.

Referring to FIG. 18, a gate assembly 360 is depicted in an embodiment of the disclosure. The gate assembly 360 includes many of the same components and attributes as the variable gate assembly 20, which are indicated with same-numbered numerical references. The gate assembly 360 may be a variable gate assembly as described above, or a binary gate assembly having only a fully opened and a fully closed static configuration. The gate assembly 360 includes a closed position proximity sensor assembly 362 and an open position proximity sensor assembly 364. The closed position proximity sensor 362 is arranged to detect the presence of the second edge 38 when the gate panel 30 is in the fully closed position. The open position proximity sensor is arranged to detect the presence of the second edge 38 when the gate panel 30 is in the fully opened position.

Referring to FIG. 19, the closed position proximity sensor assembly 362 is depicted in an embodiment of the disclosure. In the depicted embodiment, the closed proximity sensor assembly 362 includes a proximity sensor 372 disposed in a housing 374 mounted to a bracket 376. The housing 374 may be characterized as having a proximal end 373 (i.e., disposed towards the opening 25 of FIG. 18) and a distal end 375 (disposed away from the opening 25). The housing may also be characterized as including a contact face 380 that extends from the proximal end 373 to the distal end 375, for sliding engagement with the gate panel 30 during operation, as described below. In some embodiments, a sensing face 379 of the proximity sensor 372 is substantially flush with the contact face 380 of the housing 374 (e.g., FIGS. 20 and 22). Optionally, the sensing face 379 is recessed relative to the contact face 380 at a dimension $\Delta y$ (e.g., FIG. 29). In some embodiments, the dimension $\Delta y$ is less than 4 mm.

The housing 374 may define tapped holes 377 into which mounting fasteners 382 are threaded. The mounting fasteners 382 may include shanks 381 and fastener heads 383, for example, socket heads (depicted in FIG. 20), hex heads, or countersink heads (depicted in FIG. 22). The depicted embodiment includes two mounting fasteners 382: mounting fastener 382a, disposed furthest from the proximity sensor 372; and mounting fastener 382b, disposed closer to the proximity sensor 372 than mounting fastener 382a. The mounting fasteners 382 include, but are not limited to, mounting fasteners 382a and 382b. In the depicted embodiment, the mounting fasteners 382 are presented as being in line with the proximity sensor 372, but other arrangements are contemplated.

Also in the depicted embodiment, a coil spring 384 surrounds a respective one of the mounting fasteners 382a, 382b to exert a compression force FC between the bracket 376 and the housing 374 that pushes the housing 374 away from the bracket 376. While the depicted embodiment depicts coil springs 384, one for each fastener 382a and 382b, as biasing elements, other biasing elements are contemplated that are available to the artisan, including but not limited to: a single coil spring surrounding both (or more than two) mounting fasteners 382; coil spring(s) disposed between, rather than surrounding, the mounting fasteners 382; a leaf spring or bow spring(s) disposed between the bracket 376 and housing 374; an elastic plug or grommet. The mounting fasteners 382 may extend through through-holes 378 defined by the bracket 376. In some embodiments, each through-hole 378 includes a bushing 385 that anchors to the perimeter of the through-hole 378 and provides a sliding fit with the respective mounting fastener 382.

The closed position proximity sensor assembly 362 may be supported by a bracket arm 386 connected to the bracket 376. In the depicted embodiment, the bracket arm 386 extends from a junction box 388. A signal cable 392 from the proximity sensor 372 may be routed and terminated in the junction box 388. Also in the depicted embodiment, the junction box 388 is mounted to the exterior of the gate frame 24 (FIG. 18), with the bracket arm 386 extending through the gate frame 24 to support the closed position proximity sensor assembly 362 at a desired location within the retraction bay 27.

In assembly, the closed position proximity sensor assembly 362 may be assembled by inserting the bushings 385 into the through-holes 378, feeding the mounting fasteners 382 through the bushings 385, sliding the coil springs 384 over the shanks 381 of the mounting fasteners 382, and threading the mounting fasteners 382 into the tapped holes 377. The mounting fasteners 382 are tightened slightly to draw the housing 374 toward the bracket 376, thereby placing the respective coil spring 384 in compression. For installation, the closed position proximity sensor assembly 362 is mounted so that the contact face 380 of the housing 374 is brought into contact with and exerts a biasing force FB against the gate panel 30 (FIG. 23). In one embodiment, the mounting fasteners 382 are overtightened initially to draw the housing 374 closer to the bracket 376, so that when initially mounted, the housing 374 does not contact the gate panel 30. Then, after mounting of the closed position proximity sensor assembly 362 to the gate frame 24, the mounting fasteners 382 may be loosened, so that the housing 374 is pushed away from the bracket 376 and brought into biased contact with the gate panel 30, to exert the biasing force FB against the gate panel 30.

Referring to FIGS. 21 and 22, the open position proximity sensor assembly 364 is depicted in an embodiment of the disclosure. The open position proximity sensor assembly 364 includes many of the same components and attributes as the closed position proximity sensor assembly 362, which are indicated by same-numbered numerical references. In the depicted embodiment of FIGS. 21 and 22, there are again two mounting fasteners 382a and 382b, with only mounting fastener 382b fitted with the coil spring 384. Also, the through-holes 378 in the depicted embodiment are oversized so that the mounting fasteners 382 are provided substantial clearance within the through-holes 378, yet small enough to catch the heads 383 of the mounting fasteners 382. Bushings (not depicted) may also be utilized with the bracket 376 of the open position proximity sensor assembly 364, but defining an opening providing substantial clearance with the shank 381 of the respective mounting fastener 382 while capturing the heads 383 of the mounting fasteners 382. In the depicted embodiment, the heads 383 of the mounting fasteners 382 of the open position proximity sensor assembly 364 are countersink heads, to facilitate pitching of the mounting fastener 382 within the through-holes 378.

In assembly, the open position proximity sensor assembly 364 may be assembled by feeding the mounting fasteners 382 through the through-holes 378, sliding the coil spring 384 over the shank 381 of the mounting fastener 382b, and threading the mounting fasteners 382 into the tapped holes 377 of the housing 374. The mounting fastener 382b, which is fitted with the coil spring 384, is tightened slightly to draw the housing 374 toward the bracket 376, thereby placing the coil spring 384 in compression. The mounting fasteners 382a and 382b may be adjusted so that the proximal end 373 of the housing 374 is drawn closer to the bracket 376 than is the distal end 375, as depicted in FIGS. 21 and 22.

Functionally, the oversized through-holes 378 of the open position proximity sensor assembly 364 enable the housing to pitch, with both heads 383 of mounting fasteners 382a and 382b contacting the perimeters of the oversized through-holes 378. The housing 374 is thereby oriented so that the contact face 380 defines a pitch angle 4) that is inclined relative to a bottom plane 394 defined by the gate panel 30 (FIG. 25). The pitch angle 4) defines a positive slope (i.e., is inclined upwardly) from the proximal end 373 to the distal end 375 of the housing 374 of the open position proximity sensor assembly 364, and may be acute with respect a distal direction 395 (i.e., the direction of travel of the gate panel 30 in going from the fully closed position to the fully open position). The open position proximity sensor assembly 364 is mounted so that the contact face 380 of the housing 374, when inclined at pitch angle 4), intersects the bottom plane 394 (FIG. 25). In some embodiments, the housing 374 is arranged so that the proximal end 373 is below and within 5 mm of the plane defined by the bottom edges 33 of the slots 32. Also, the open position proximity sensor assembly 364 may be positioned so that the proximity sensor 372 detects the presence of the second edge 38 of the gate panel 30 when the gate panel 30 is in the fully opened position (FIG. 24).

Referring to FIGS. 23 and 24, operation of the closed position proximity sensor assembly 362 is depicted in an embodiment of the disclosure. With the gate panel 30 in the fully closed position (FIG. 23), the proximity sensor 372 of the closed position proximity sensor assembly 362 is positioned to detect the presence of the second edge 38 of the gate panel 30 and generates a signal (e.g., voltage, current or sensed closure) indicating the gate panel 30 is fully closed. When the gate panel 30 is translated to a partially open or a fully opened position (fully opened position being depicted in FIG. 24), the second edge 38 of the gate panel 30 is removed from the sensing range of the proximity sensor 372 of the closed position proximity sensor assembly 362, and the proximity sensor 372 generates a corresponding signal indicating that the gate panel 30 is no longer in the fully closed position. Throughout these operations, exertion the biasing force FB of the closed position proximity sensor assembly 362 against the gate panel 30 effectively assures that no granular material becomes lodged between the closed position proximity sensor assembly 362 and the gate panel 30.

Referring to FIGS. 25 and 26, and again to FIGS. 23 and 24, operation of the open position proximity sensor assembly 364 is depicted in an embodiment of the disclosure. In the depicted embodiment, when the gate panel 30 is in either a fully closed position or a partially opened position (fully closed position being depicted in FIG. 23), the second edge 38 of the gate panel 30 is removed from the sensing range of the proximity sensor 372 of the open position proximity sensor assembly 364, and the proximity sensor 372 of the open position proximity sensor assembly 364 generates a corresponding signal indicating that the gate panel 30 is not in the fully opened position. When the gate panel is in the fully opened position (FIGS. 24 and 26), the second edge 38 of the gate panel 30 is within the sensing range of the proximity sensor 372 of the open position proximity sensor assembly 364, and the proximity sensor 372 of the open position proximity sensor assembly 364 generates a corresponding signal indicating that the gate panel 30 is in the fully opened position.

As the gate panel 30 approaches the fully opened position (FIG. 25 through to FIG. 26), the second edge 38 of the gate panel 30 engages and slides over the contact face 380 of the housing 374, causing the housing 374 to pitch into alignment with the bottom plane 394 of the gate panel 30, as indicated by arrow 396 in FIG. 26. The pitching of the housing 374 causes the housing 374 to substantially rotate about the head 383 of the mounting fastener 382a and place the coil spring 384 in compression so that the housing 374 of the open position proximity sensor assembly 364 exerts a bias force FB against the gate panel 30. Also, exertion the biasing force FB of the open position proximity sensor assembly 364 against the gate panel 30, along with the engagement of the contact face 380 with the distally-moving second edge 38 of the gate panel 30, causes a sweeping action over the contact face 380, clearing the contact face 380 of granular material so that the proximity sensor 372 reliably, repeatedly, and accurately detects the presence of the second edge 38 when the gate panel 30 is in the fully opened position.

The described arrangement of the closed position proximity sensor assembly 362 and the open position proximity sensor assembly 364 has been found to perform repeatedly and reliably, even where the retraction bay 27 is filled with granular material to a level that buries the sensor assemblies 362 and 364. This condition is depicted in FIGS. 23 and 24, illustrating the sensor assemblies 362 and 364 immersed in granular material 398.

The signals generated by the closed position proximity sensor assembly 362 and the open position proximity sensor assembly 364 may be utilized by the central controller (e.g., microprocessor 100) for control of the gate panel 30, such as ceasing movement of the gate panel 30 upon an indication that the fully closed or the fully opened position has been achieved.

Referring to FIGS. 27 and 28, an alternative open position proximity sensor assembly 364a is depicted in an embodiment of the disclosure. The alternative open position proximity sensor assembly 364a includes many of the components and attributes as the open position proximity sensor assembly 364, which are indicated with same-numbered numerical references. Instead of pivoting about a fastener (i.e., mounting fastener 382a), the housing 374 is mounted to a pivot pin 399 that extends lateral to the distal direction 395 into or through the housing 374, the pivot pin 399 being suspended from the bracket 376 by a mount 397. In the depicted embodiment, the mount 397 and pivot pin 399 are proximal to the mounting fastener 382b. Upon engagement with the second edge 38 of the gate panel 30, the alternative open position proximity sensor assembly 364a rotates about the pivot 399. The operation of the alternative open position proximity sensor assembly 364a is otherwise the same as described for the open position proximity sensor assembly 364.

Figure 29:
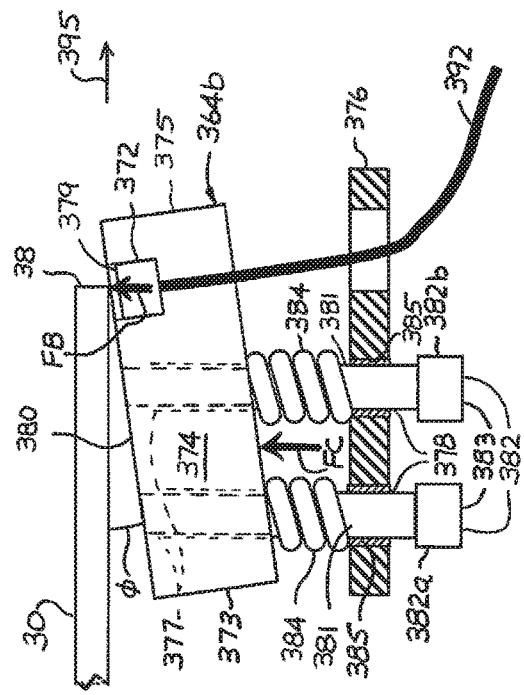
FIG. 29 is a sectional view of a canted open position proximity sensor assembly with the gate panel approaching in a distal direction in an embodiment of the disclosure.
Figure 30:
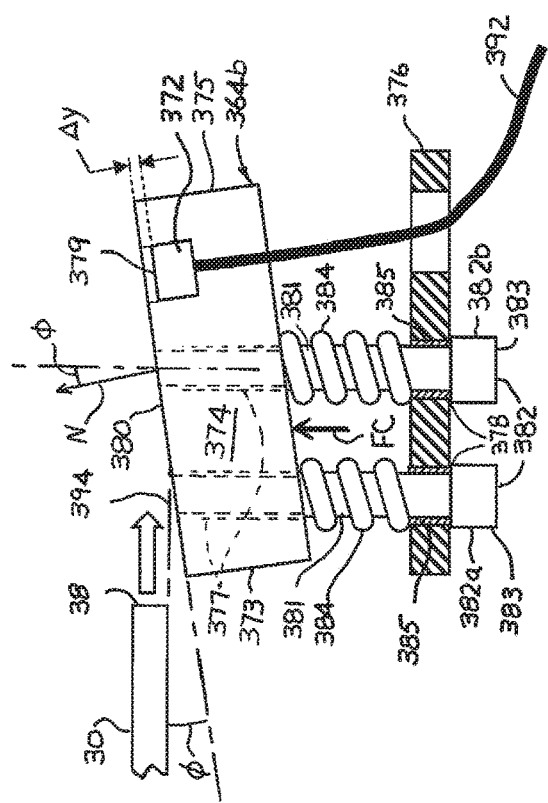
FIG. 30 is a sectional view of the canted open position proximity sensor of FIG. 29 with the gate panel engaged therewith in the fully open position in an embodiment of the disclosure.

Referring to FIGS. 29 and 30, a canted open position proximity sensor assembly 364b is depicted in an embodiment of the disclosure. The canted open position proximity sensor assembly 364a includes many of the components and attributes as the open position proximity sensor assemblies 364 and 364a, which are indicated with same-numbered numerical references. Instead of pivoting about a fastener (i.e., mounting fastener 382a), the canted open position proximity sensor assembly 364b is configured so that the housing 374 translates toward the bracket 376 with little or no rotation, thereby maintaining substantially the same acute angle φ between the contact face 380 of the housing 374 and the bottom plane 394 of the gate panel 30, both prior to (FIG. 29) and during (FIG. 30) engagement with the gate panel 30. In the depicted embodiment, to facilitate the translational aspects of the canted open position proximity sensor assembly 364b, the bushings 385 are sized to provide a sliding fit with the respective mounting fasteners 382, thus inhibiting pitching of the mounting fasteners 382 within the bushings 385. Also in the depicted embodiment, the tapped holes 377 of the housing 374 are tapped at an angle φ relative to a normal vector N of the contact face 380 that is the same as the desired acute angle φ to be defined between the gate panel 30 and the contact face 380.

Functionally, by maintaining a substantially fixed acute angle φ between the gate panel 30 and the contact face 380, the contact face does not rotate into frontal contact with the gate panel 30. Accordingly, concern over granular material becoming lodged between the gate panel 30 and the contact face 380 is reduced, because the canted open position proximity sensor assembly 364b does not rely on full frontal contact with the gate panel 30 for proper operation. The edge second edge 38 is still in repeatable contact with the contact face 380 of the housing 374 at the position of the proximity sensor 372.

Each of the additional figures and methods disclosed herein can be used separately, or in conjunction with other features and methods, to provide improved containers and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant art will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:
1. A gate assembly, comprising:
a gate frame that defines an opening, the opening being adapted for flow of a bulk material therethrough;
a gate panel translatably mounted within the gate frame, the gate panel including
a first edge that is translatable within the opening of the gate frame during operation, and
a second edge opposite the first edge; and
a closed position proximity sensor assembly positioned to detect the second edge of the gate panel when the gate panel is in a fully closed position,
wherein the closed position proximity sensor assembly is biased against the gate panel to maintain sliding contact with the gate panel over an entire range of travel of the gate panel.
2. The gate assembly of claim 1, comprising:
an open position proximity sensor assembly positioned to detect the second edge of the gate panel when the gate panel is in a fully opened position,
wherein the open position proximity sensor assembly is biased against the gate panel and is in sliding contact with the gate panel when the gate panel approaches the fully opened position.
3. The gate assembly of claim 2, wherein one or both of the closed position proximity sensor assembly and the open position proximity sensor assembly includes an inductive sensor.
4. The gate assembly of claim 2, wherein the open position proximity sensor assembly is disengaged from the gate panel when the gate panel is in the fully closed position.

5. The gate assembly of claim 4, wherein a contact face of the open position proximity sensor assembly is arranged at an acute angle relative to a plane of travel of the gate panel when disengaged from the gate panel, the open position proximity sensor being configured to engage and be biased against the gate panel after engagement with the gate panel.

6. The gate assembly of claim 5, wherein the contact face rotates into an orientation that is substantially parallel to the plane of travel after engagement with the gate panel.

7. The gate assembly of claim 5, wherein the contact face of the open position proximity sensor is positioned to intersect the plane of travel.

8. The gate assembly of claim 2, wherein one or both of the closed position proximity sensor assembly and the open position proximity sensor assembly includes a sensing element disposed in a housing.

9. The gate assembly of claim 8, wherein the sensing element of the one or both of the closed position proximity sensor assembly and the open position proximity sensor assembly includes a sensing face that is substantially flush with a contact face of the housing, the contact face of the housing being configured for the sliding contact with the gate panel.

10. The gate assembly of claim 8, wherein one or both of the closed position proximity sensor assembly and the open position proximity sensor assembly is biased against the gate panel by a spring that is in contact with the housing.

11. The gate assembly of claim 10, wherein one or both of the closed position proximity sensor assembly and the open position proximity sensor assembly is mounted to a bracket, the spring acting to bias the housing away from the bracket.

12. The gate assembly of claim 2, wherein the open position proximity sensor assembly includes:
a bracket;
a sensing element disposed in a housing, the housing being pivotally coupled to the bracket; and
a spring disposed between and in contact with the housing and the bracket,
wherein the open position proximity sensor assembly is biased against the gate panel by the spring.

13. The gate assembly of claim 1, wherein the gate panel is adapted for translation to a plurality of intermediate static positions, each of the plurality of intermediate static positions being intermediate between the fully closed position and the fully open position within the gate frame.

14. The gate assembly of claim 1, wherein:
the gate frame includes a retraction bay adjacent the opening; and
the second edge of the gate frame is translatable within the retraction bay of the gate frame during operation.

15. A gate assembly, comprising:
a gate frame that defines an opening, the opening being adapted for flow of a granular agricultural material therethrough;
a gate panel translatably mounted within the gate frame, the gate panel including
a first edge that is translatable within the opening of the gate frame during operation, and
a second edge opposite the first edge; and
an open position proximity sensor assembly positioned to detect the second edge of the gate panel when the gate panel is in a fully opened position,
wherein the open position proximity sensor assembly is biased against the gate panel and is in sliding contact with the gate panel when the gate panel approaches the fully opened position.

16. The gate assembly of claim 15, comprising:
a closed position proximity sensor assembly positioned to detect the second edge of the gate panel when the gate panel is in a fully closed position,
wherein the closed position proximity sensor assembly is biased against the gate panel to maintain sliding contact with the gate panel over an entire range of travel of the gate panel.

17. The gate assembly of claim 15, wherein a contact face of the open position proximity sensor assembly is arranged at an acute angle relative to a plane of travel of the gate panel when disengaged from the gate panel, the open position proximity sensor being configured to engage and be biased against the gate panel after engagement with the gate panel.

18. The gate assembly of claim 17, wherein the contact face of the open position proximity sensor is positioned to intersect the plane of travel.

19. The gate assembly of claim 15, wherein the open position proximity sensor assembly includes:
a bracket;
a sensing element disposed in a housing, the housing being pivotally coupled to the bracket; and
a spring disposed between and in contact with the housing and the bracket,
wherein the open position proximity sensor assembly is biased against the gate panel by the spring.

20. The gate assembly of claim 19, wherein the housing is pivotable about a pivot pin that extends lateral to a direction of travel of the gate panel.

21. The gate assembly of claim 19, wherein the housing is pivotable about a head of a mounting fastener, the mounting fastener extending from the bracket to the housing, the head of the mounting fastener being in contact with the bracket.

22. The gate assembly of claim 19, wherein the spring is a coil spring.

* * * * *